United States Patent
Erad et al.

(10) Patent No.: US 8,988,283 B2
(45) Date of Patent: Mar. 24, 2015

(54) DIRECTION FINDING SYSTEM DEVICE AND METHOD

(75) Inventors: Yariv Erad, Kidron (IL); Uri Vered, Rishon Lezion (IL); Gal Vered, Be'er Ya'acov (IL); Menachem Erad, Ashdod (IL)

(73) Assignee: Hisep Technology Ltd., Yavne (IL)

( * ) Notice: Subject to any disclaimer, the term of this patent is extended or adjusted under 35 U.S.C. 154(b) by 333 days.

(21) Appl. No.: 13/634,736

(22) PCT Filed: Mar. 16, 2011

(86) PCT No.: PCT/IL2011/000251
§ 371 (c)(1),
(2), (4) Date: Sep. 13, 2012

(87) PCT Pub. No.: WO2011/114330
PCT Pub. Date: Sep. 22, 2011

(65) Prior Publication Data
US 2013/0002489 A1 Jan. 3, 2013

Related U.S. Application Data

(60) Provisional application No. 61/314,606, filed on Mar. 17, 2010, provisional application No. 61/329,101, filed on Apr. 29, 2010, provisional application No. 61/346,130, filed on May 19, 2010, provisional application No. 61/376,308, filed on Aug. 24, 2010, provisional application No. 61/376,286, filed on Aug. 24, 2010.

(51) Int. Cl.
*G01S 5/04* (2006.01)
*G01S 3/20* (2006.01)
*H01Q 21/29* (2006.01)

(52) U.S. Cl.
CPC . *G01S 3/20* (2013.01); *H01Q 21/29* (2013.01)

USPC .......................................................... 342/432

(58) Field of Classification Search
USPC ......................... 342/432, 434, 437, 443, 417
See application file for complete search history.

(56) References Cited

U.S. PATENT DOCUMENTS

| 6,693,591 B2 | 2/2004 | Ferreol |
| 6,838,987 B1 | 1/2005 | Quinonez |

(Continued)

FOREIGN PATENT DOCUMENTS

WO WO-2009/147662 A1 12/2009

OTHER PUBLICATIONS

International Preliminary Report on Patentability, dated Mar. 17, 2010.

*Primary Examiner* — Harry Liu
(74) *Attorney, Agent, or Firm* — Alston & Bird LLP

(57) ABSTRACT

The present invention relates to a method for determining the direction to a target by a direction finder, which comprises: predefining a direction axis as a 0° direction; first and second pair of antennas arranged such that a first line connecting between the first pair of antennae defines a 0°-180° axis parallel to said direction axis, and a second line connecting said second pair of antennas defines a 90°-270° axis perpendicular to said direction axis; generating a 0° antenna pattern and establishing a wireless communication between the direction finder and said target; attenuating the wireless communication signal until lost and recording the attenuation value; generating a 180° antenna pattern using said first pair of antennas, and establishing a wireless communication between the direction finder and said target; attenuating the wireless communication signal until lost, and recording the attenuation value and concluding a true direction to the target.

32 Claims, 34 Drawing Sheets

(56) References Cited

U.S. PATENT DOCUMENTS

| | | |
|---|---|---|
| 2001/0000959 A1 | 5/2001 | Campana |
| 2007/0298724 A1 | 12/2007 | Sulkowski et al. |
| 2008/0068263 A1 | 3/2008 | Tekawy et al. |
| 2009/0219209 A1 | 9/2009 | Bush et al. |
| 2010/0070758 A1 | 3/2010 | Low et al. |
| 2010/0085257 A1 | 4/2010 | Kalliola et al. |
| 2010/0117894 A1* | 5/2010 | Velde et al. .............. 342/357.02 |
| 2010/0279768 A1 | 11/2010 | Huang et al. |

* cited by examiner

609a →

| R-N (dB) | φ₁ | φ₂ | φ₃ |
|---|---|---|---|
| ------- | 0° | 0° | 0° |
| ------- | ------- | ------- | ------- |
| ------- | ------- | ------- | ------- |
| ⋮ | ⋮ | ⋮ | ⋮ |
|  | 10° | 80° | 150° |
| ⋮ | ⋮ | ⋮ | ⋮ |
| ------- | 359° | 359° | 359° |

| R-N (dB) | φ₁ | φ₂ | φ₃ |
|---|---|---|---|
| ------- | -90° | -90° | -90° |
| ------- | ------- | ------- | ------- |
| ------- | ------- | ------- | ------- |
| ⋮ | ⋮ | ⋮ | ⋮ |
| ------- | +90° | +90° | +90° |

Fig. 17b

DIRECTION FINDING SYSTEM DEVICE AND METHOD

FIELD OF THE INVENTION

The present invention relates to the field of determining the direction to a wireless communication source. More particularly, the invention relates to a system device and method for finding the relative location (i.e., direction, distance and elevation difference) between a direction finder and one or more wireless communication sources located within a communication range.

BACKGROUND OF THE INVENTION

The art has provided many ways for a direction finder (DF) to determine the direction to an RF source (target), mainly by various wave analysis procedures.

Direction finding techniques can be categorized in groups, those which find the direction of the target based on the received signal amplitude, based on the received signal phase, based on received signal timing, or those which are based on several of said attributes of the received signal.

One of the major challenges all direction-finding techniques face, in most situations, but mainly within a reflective environment, is to overcome the multipath reflections problem. Multipath reflections can cause false indications regarding the direction of the targeted RF source. Reflection of waves is expected from nearby objects, such as walls, or metallic objects. Waves transmitted from a target may be scattered and reflected from nearby objects such as wall, and arrive to the direction finder via many waves and from many directions. The reflected waves are weaker due to the following facts: (a) the reflected waves travel a loner path; (b) The reflected waves are scattered to many directions; and (c) the reflected waves from an object suffer from reflection losses. The reflected waves arrive at the DF later than the direct wave due to the longer path. These reflections are combined with the direct wave, distorting the amplitude, phase, and time of arrival of the signal. In prior art direction finding techniques that are based on measuring the signals amplitude, phase, or time of arrival, these multi-path reflections cause sever errors in the direction finding.

Amplitude-Based Direction Finding Techniques:

These direction finding techniques use one or more antennas. An example of a single antenna direction finding is a rotational directional antenna. The direction from which the received signal strength (RSS) or received signal strength indication (RSSI), or equivalent thereof is the highest, is the expected direction to the target. Amplitude based directional finders that use several antennas measure the RSS/RSSI at each antenna and calculate from these amplitude differences the Angle of Arrival (AOA) of the signal. An example for an amplitude directional finder which uses several antennas is the monopulse system.

Additional techniques assess the distance to the target, based on the signal strength, and by triangulating several measurements calculate the location or the direction to the target.

Phase-Based Direction Finding Techniques:

These directional finders use two or more antennas and measure the phase difference of the arrival of a signal in plurality of antennas and calculate from these phase differences the AOA of the signal. This group includes, for example, interferometer direction finder, correlative interferometer direction finder, passed array systems, etc.

Time-Based Directional Finder Techniques:

These directional finders are also known as TOA (Time of Arrival) type directional finders. They use two or more antennas and measure the time difference of the arrival of a signal to plurality of antennas and calculate from these differences the AOA of the signal. This group includes, for example short and long base TOA, DTOA (Differential Time of Arrival) etc.

Monopulse DF Techniques:

This technique is mainly used in ELINT (Electronic Intelligence) systems and radars, to find the direction from which a pulsed radar signal or echo is received. The signal is received in two or more directional antennas. The signals in the antennas, usually highly directional antennas, are added in phase to create a sum (Σ) signal, and added in opposite phase to create a Difference (Δ) signal, in one or two dimensions, azimuth, elevation or both. Based on the Σ and Δ signal strengths, the direction of the target is determined.

All said prior art techniques rely on one or more properties of the received signal, and therefore require relatively complicated calculations and analysis, and are also relatively expensive. Therefore, said techniques are generally not suitable for small size and relatively simple wireless personal devices, such as cellular phones, PDAs, digital cameras, remote-control devices. Such devices are small in size, are provided in many cases with two or more simple omni directional or very low gain directional antennas, and are relatively of low cost. Furthermore, in many cases such devices comprise of only one receiving channel for each antenna, and therefore are not suitable for using the abovementioned prior art techniques, unless significantly increasing their size, and or price.

WO 2009/147662 by same applicants and inventors provides a direction finding technique and device that are invulnerable to reflections of the signal from nearby objects, such as walls. WO 2009/147662 also provides a direction finding technique and device, for determining those wireless communicating devices (hereinafter "target devices") that are located within a predefined direction sector of interest. Said publication also provides such direction finding technique and device that are simple and reliable. WO 2009/147662 also provides a direction finding technique and device that do not depend on attributes of the signal such as its amplitude, phase, or time of arrival. WO 2009/147662 also provides a direction finding technique and device that can further discriminate between wireless communicating devices that are located at the front and those that are located at the back of the device. WO 2009/147662 also provides such direction finding technique and device that are compact in size, and therefore well adapted to small and relatively cheap personal devices, such as cellular phone, PDAs, digital camera, remote controls, etc. The system, device and technique of technique of WO 2009/147662 is simple and reliable.

WO 2009/147662 can determine only whether a target is located within a predefined sector, however it does not provide a radar-alike (i.e., direction, distance and elevation difference of each target in relation to the DF) display of one or more targets that are located within the communication range. WO 2009/147662 also does not teach a system method and device which can determine the three dimensional (3D) direction distance and location of multiple target devices that are located within the communication range. WO 2009/147662 also does not teach a system method and device that can determine the elevation of multiple target devices that are located within the communication range.

In another aspect, Location-Based Services (LBS) have become a common service these days, mainly in mobile electric devices such as cellular phones, navigation devices, tablet computers, and even digital cameras. A key element of LBS is the ability to determine the location of a user of an electronic device. This location is determined using location determination systems such as GPS, Wi-Fi positioning systems, cell-ID, RFID real-time location systems (RTLS), etc. Upon determination of the location of the user within by the location determination system, the location can be coupled to a graphical layout of the area—i.e., a map, and displayed. By monitoring more than one user, or by receiving an updated data by users regarding their location, as determined by location determination systems, services have evolved to utilize the location data. Users can operate features of social networking application, commerce, navigation, gaming and more.

In many cases, a key goal of LBS is to offer users proximity-related information. For example, a user of a LBS social network application can see other users that are presently located miles away, but it is more than likely that he would like to find out who is in his immediate proximity, i.e., 100-200 m range. However, ALL the prior art LBS depend on location determination systems that are external of the mobile device, and cannot function without them. Therefore, in addition to such LBS, a new type of services has emerged, called Proximity-Based Services (PBS). Some PBS are based on the direct wireless communication between electronic devices and not on location determination systems (see Wi-Fi Direct™, FlashLinQ™, Bluetooth, etc). The proliferation of wireless communication devices in general, and the integration of short-range wireless communication components (such as, but not limited to Wi-Fi, Bluetooth, NFC, RFID, Wi-Max, etc.) into electronic devices, enable broadcasting and sharing of data and communication directly between devices, i.e., not via a relay such as a router or a central server. For example, Bluetooth enables direct wireless communication between at least 2 devices. Wi-Fi Ad-hoc mode enables the creation of network devices without the use of a router. Also, an upcoming standard called Wi-Fi Direct™ will enable Wi-Fi equipped electronic devices to easily create direct wireless communication between them. Key element for these examples is that they need to be in proximity to one another, i.e., within a direct wireless communication range from one another, otherwise they cannot establish direct wireless communication. This differs from relay-based wireless communications, in which electronic devices can be within the wireless communication range of the same router (for example) but not necessarily directly with one another. By determining direction and/or distance and/or height difference between electronic devices, utilizing the direct wireless communication between the devices, PBS can be provided without the need to use location determination systems. A user may wish to find direction and/or distance and/or height difference from his device to at least one another user in his proximity. By establishing direct wireless communication with electronic devices in his proximity, the user may wish to see WHAT electronic devices are near him (i.e., what is known as "Discovery"), and WHO the users are. By using direction-finding methods and techniques, the user may be able to see the directions from him to other users or electronic devices. Same goes for distance and height difference measurement. The key element here is that no location determination system is used, and directions and/or distances and/or height differences are relative between the electronic devices and can be determined without the use of any supporting location determination system and/or third party database and/or map and/or infrastructure. The methods and illustrations described hereunder aim to cover all possible scenarios, even ones not explicitly described, in which there is a direct wireless communication between at least 2 wireless communication devices. The invention described hereunder utilizes the common availability of wireless communications such as (but not limited to) Wi-Fi or Bluetooth which exists in almost any electronic device today, together with the growing integration of Tilt sensors, such as accelerometers, Gyroscopes, or digital compasses into these devices.

As will be demonstrated, the invention uses a direct wireless communication, or direct P2P wireless communication between electronic devices, in which at least one is a direction finding (DF) device and at least one is a target, without the use of any external location determination system. Said wireless communication can be performed without any applicable wireless communication protocol.

US 2010/0070758 entitled "Group Formation Using Anonymous Broadcast Information" discloses definition of a group as one or more devices that are in transmission range of each other for a period of time, referred to as a "contact time." The users associated with the devices in the Group are referred to as Group members. Us 2010/0279768 entitled "Game With Direction Aware Device" discloses a gaming with Co-Located, Networked Direction and Location Aware Devices a gaming system on an iPhone that can create an augmented reality by using the device's camera and sensing the device's location and orientation. U.S. Pat. No. 6,693,591 entitled "Method and Device for Cooperative Radio Direction Finding in Transmission". This patent discloses the Finding of the direction using cooperative communication essentially GPS and UMTS, requiring a synchronization signal and based on time of arrival from multiple transmitters. US 2009/0219209 entitled "Location determination" the finding of devices' own location rather than other target's direction or location with respect to the device. These patents require an infrastructure of other transmitters in the area, for the DF and location process. U.S. Pat. No. 6,838,987 entitled "Vehicle Locating System" discloses vehicle location and indication of the direction by highly directional antenna and distance using RSSI. US 2010/0085257 entitled "System and Method for Direction Finding Using a Hand Held Device" Shows on the screen targets like bus station, railway station, police station etc. Only the direction is shown, found by switching between 6 antennas using Bartlett Beamformer. Sending and receiving dedicated data is required.

It is therefore an object of the present invention to provide a system method and device that present a radar-alike display in which the relative location of each target with respect to the location of a direction device, is displayed, whether in 2D or 3D.

It is therefore another object of the present invention to provide a system method and device for determining the 3D direction distance and elevation difference of multiple target devices that are located within the communication range.

It is another object of the present invention to provide a system method and device for determining the 3D relative location of multiple target devices that are located within the communication range, that are invulnerable to reflections of the signal from nearby objects, such as walls, metallic objects, etc.

It is another object of this invention to apply sensors or combinations of sensors for compensating for the orientation of the DF device at the time when the measurement is made.

It is still another object of the present invention to provide said system method and device that are simple in structure and reliable.

It is still another object of the present invention to provide said system method and device that do not depend on attributes of the signal such as its amplitude, phase, or time of arrival.

It is still another object of the present invention to provide said system method and device that are compact in size, and therefore well adapted to small and relatively cheap personal devices, such as cellular phone, PDAs, digital camera, remote controls, etc.

It is still another object of the present invention to provide said system method and device that are capable of determining a relative location between target devices that are located within the communication range.

It is still another object of the present invention to enable navigation to target devices that have been detected within the communication range.

It is another object of the present invention to display to a user in a radar alike manner at least one target device, wherein said display indicates the relative direction, distance, height, or any combination thereof relative to the DF.

It is another object of the present invention carry out all the above independently by the DF, without need of any external positioning determination systems.

It is another object of the present invention to limit (i.e., filter) the display to a selected sector, range, targets, or various other criteria that relate either to the targets or to the user geographic preferences. Targets may be filtered in a random or pre-defined order. Landmarks and Marks may also be categorized and used. For example, targets are categorized and displayed based on their types—for example, person, place, or product. Different colors, sounds and other means of graphical symbols are also used to differentiate between each type.

It is still another object of the present invention to provide means for tracking and/or monitoring changes in relative locations of one or more targets in comparison to the DF.

It is still another object of the present invention to enable a user to select at least one target and define it as a "landmark" or "mark", that are in turn serve as additional reference to other targets.

It is another still object of the present invention to enable a user to "block" selected targets from conducting a direct wireless communication with the DF.

It is still another object of the present invention to use ID of targets prior to initiating the direction-finding, or post of such direction finding, as a part of a filter/sorting of targets.

It is still another object of the present invention to use the DF of the present invention for distributing sound to targets that are provided with speakers.

It is still another object of the present invention to use the DF for distributing data of any type, or performing various types of operations on selected targets following said targets direction, distance of height determination.

Other objects and advantages of the invention will become apparent as the description proceeds.

SUMMARY OF THE INVENTION

The present invention relates to a method for determining the direction to a target by a direction finder, which comprises: (a) predefining a direction axis on a plane of the direction finder as a 0° direction; (b) providing on said plane of the direction finder a first pair and a second pair of antennas, said first and second pairs of antennas are arranged in such a configuration that a first line connecting between the two antennas of the first pair defines a 0°-180° axis which is parallel to said direction axis of the direction finder, and a second line connecting between the two antennas of said second pair of antennas defines a 90°-270° axis which is perpendicular to said direction axis of the direction finder; (c) generating a 0° antenna pattern A using said first pair of antennas, and establishing a wireless communication between the direction finder and said target; (d) attenuating the wireless communication signal between the direction finder and said target until the wireless communication is lost, and recording the attenuation value $R_A$ which corresponds to said loss of wireless communication; (e) generating a 180° antenna pattern B using said first pair of antennas, and establishing a wireless communication between the direction finder and said target; (f) attenuating the wireless communication signal between the direction finder and said target until the wireless communication is lost, and recording the attenuation value $N_B$ which corresponds to said loss of wireless communication; (g) determining from the relation between attenuations $R_A$ and $N_B$ and from the respective antenna patterns A and B one or more possible directions to the target; (h) repeating steps (c)-(g) for antenna patterns C and D in 90° and 270° respectively while using said second pair of antennas, and determining from the respective antenna patterns C and D and from the relation between attenuations $R_C$ and $N_D$ one or more additional possible directions to the target; and (i) correlating between all the directions as obtained in steps (g) and (h) and concluding a true direction $\phi$ to the target.

Preferably, each of the antenna patterns has a form of a cardioid.

Preferably, said two pairs of antennas are four antennas that are arranged in a rhombus configuration.

Preferably, said two pairs of antennas are three antennas that are arranged in a right isosceles triangle, while one of the antennas is common to the two pairs of antennas.

Preferably, a loss of wireless communication is a loss of handshake between the direction finder and the target.

Preferably, the communication signal which is attenuated up to a point of loss of communication is the received signal or the transmitted signal.

Preferably, the method may be used for a 2D direction finding, wherein said plane of the direction finder is maintained essentially horizontally during said direction finding.

Preferably, the method is further used for finding the elevation angle between the direction finder and the target, which further comprises the step of: while maintaining said plane of the direction finder essentially vertical, performing steps (c)-(g), resulting in determination of one or more elevation angles $\theta$ to the target.

Preferably, the method further comprises a verification procedure for the determined elevation angle, which comprises repeating said steps (c)-(g) while using another pair of antennas, and correlation of the results to the previous ones to obtain a true elevation angle.

Preferably, the method is further used for determining the distance from the target, wherein the distance is determined using the round trip time of the signal between the direction finder and the target, the speed of light, and the processing times of the direction finder and the target.

Preferably, the method compensates a case where the device is not held perfectly vertical, wherein the direction finder further comprises a tilt sensor for measuring the tilt angle $\delta$ of the direction finder relative to an axis vertical to the horizon, and subtracting this tilt angle from the elevation angle $\theta$ to obtain a true elevation angle.

Preferably, the method further compensates for a case where the device is not held perfectly horizontal, wherein the direction finder further comprises a tilt sensor for measuring the tilt angle $\delta$ of the direction finder relative to an axis vertical to the horizon, and compensating respectively the direction $\phi$ to obtain a true direction angle $\phi$ to the target.

Preferably, the measured angle $\delta$ serves for the device as an indication to perform a 2D direction measurement when $\delta$ is essentially 0°, an elevation angle measurement when δ is essentially 90°, or both a 2D measurement and an elevation angle measurement when δ is essentially 45° thereby performing a 3D measurement.

Preferably, each determination of the possible directions to the target based on the respective attenuations and on the antenna patterns is performed using one or more equations or one or more look up tables.

Preferably, each determination of the possible elevation of the target with respect to the direction finder based on the respective attenuations and on the antenna patterns is performed using one or more equations or one or more look up tables.

Preferably, the look up tables or equations also comprise correction factors to compensate for one or more of: (a) a specific pair of antennas in use and the characteristics of each antenna; (b) a 2D or 3D mode of operation, and the tilt angle of holding the device; (c) an operating frequency of the communication; (d) an antenna type in use; and (e) effect of the manner of holding the direction finder by the user hands on the antennas patterns.

Preferably, the targets 2D or 3D locations are displayed in a radar-alike manner.

Preferably, the method also includes requesting by the direction finder and receiving from the target additional information relating to the identity of the target, its status, its type, or its characteristics, and displaying to the user at least a portion thereof.

Preferably, the method further comprises filtering from the display at least some of the targets, based on targets type, status, location, range from the direction finder or a target, characteristics of targets, angular sector, or a combination thereof.

Preferably, the method is also used for monitoring of a child, wherein the target is attached to a child.

Preferably, the target is attached to a product or is located at a specific department of a store, and wherein the direction to the product or said specific department respectively is determined and displayed.

Preferably, one or more of the targets are defined as Landmarks or Marks.

Preferably, relative distances, elevations, and directions between targets are calculated and displayed.

Preferably, the method is performed repeatedly for the purpose of navigation.

Preferably, when both the direction finder and the target are in movement, an estimated meeting location between them is calculated and displayed at the DF.

Preferably, the method further comprises a step of transferring by the direction finder data to the target, or performing operation at the DF based on the results of the direction finding.

Preferably, the method of the invention may be used for operating a music system, wherein at a first stage targets are located and assigned a speaker name, and at a second stage music data are transferred respectively to each of the targets.

The invention also relates to a direction finder for determining the direction to a target, which comprises: (a) a first pair and a second pair of antennas, said first and second pairs of antennas are arranged on a plane of the direction finder in such a configuration that a first line connecting between the two antennas of the first pair defines a 0°-180° axis which is parallel to said direction axis of the direction finder, and a second line connecting between the two antennas of said second pair of antennas defines a 90°-270° axis which is perpendicular to said direction axis of the direction finder; (b) a wireless communication unit for establishing communication with a target via a wireless communication signal; (c) a controlled attenuator for attenuating said wireless communication signal; (d) a hybrid junction for enabling wireless communication of said signal in a selected antenna pattern each time via one of said pairs of antennas; and (e) a processing unit for: (e.1). switching said hybrid junction to generate and transmit a 0° antenna pattern A through the first pair of antennas, attenuating the signal until the wireless communication is lost, and recording the attenuation value which corresponds to said loss of wireless communication as an $R_A$ attenuation value; (e.2) switching at the hybrid junction to generate a 180° antenna pattern B through the first pair of antennas, attenuating the signal until the wireless communication is lost, and recording the attenuation value which corresponds to said loss of wireless communication as an $N_B$ attenuation value; (e.3) using one or more equations or look up tables, determining from the difference $R_A$-$N_B$, one or more possible directions to the target; (e.4) repeating steps (e.1)-(e.3) while transmitting antenna patterns C and D in 90° and 270° respectively through the second pair of antennas, and determining from the antenna patterns C and D respectively and from the relation between attenuations $R_C$ and $N_D$ one or more additional possible directions to the target; and (e.5) correlating between all the directions as obtained in steps (e.3) and (e.4) and concluding a true direction φ to the target.

In one embodiment, said wireless communication unit, controlled attenuator, and hybrid junction are implemented by software.

In an embodiment of the invention, the direction finder is used for finding a 2D direction to the target. In that case, the direction finder further finds the elevation of the target with respect to the direction finder, wherein the processing unit is further used for: while maintaining said plane of the direction finder essentially vertical, performing steps (e.1)-(e.3), resulting in determination of one or more elevation angles θ between the direction finder and the target.

Preferably, the direction finder further comprises a tilt sensor for measuring the tilt angle δ of the direction finder relative to an axis vertical to the horizon, and subtracting this tilt angle from the determined elevation angle θ to obtain a true elevation angle, thereby compensating for a case where the direction finder is not held perfectly vertical.

BRIEF DESCRIPTION OF THE DRAWINGS

In the drawings:

FIGS. 17a and 17b show two examples for lookup tables, that can be used by the device of the present invention;

DETAILED DESCRIPTION OF PREFERRED EMBODIMENTS

Definition of Terms

Figure 1:
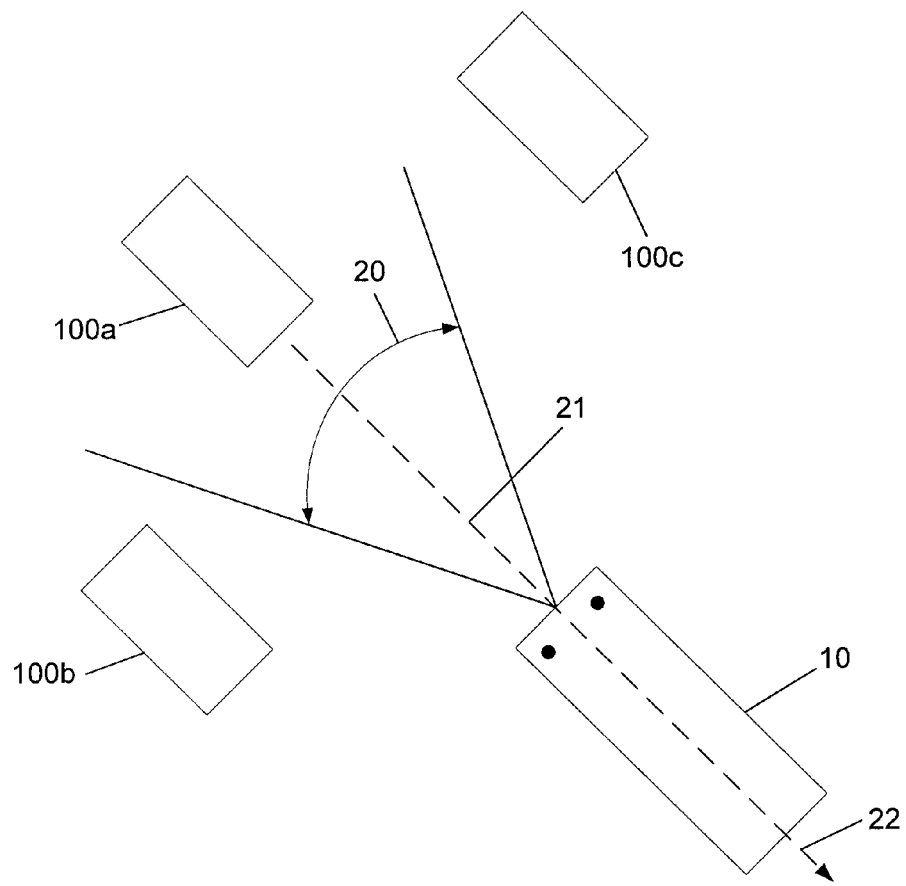
FIG. 1 shows a direction finder according to an embodiment of the WO 2009/147662, whose objective is to determine those targets that are located within a sector of interest.

"Wireless Communication"—refers to the transfer of information and/or data and/or packets (formatted blocks of data) of any type or level and/or voice over long or short distances without the use of electrical conductors or "wires" but via Radio waves, at any given frequency.

"Wireless Communication Protocol and/or Standard"—shall refer to any protocol and/or standard used to conduct wireless communication, such as, but not limited to, wireless information technology, cellular communication (such as, but not limited to, GSM, GPRS, CDMA), wireless networks, WLAN computer communications, wireless networking standards, such as, IEEE 802.11), wireless personal area networks (WPAN) and wireless mesh networks. (it should be clearly noted that among such protocols, but not limited only to them, are Wi-Fi, Bluetooth, Wi-Max, ZigBee, Z-wave, Insteon, cellular devices communication protocols, Near-Field Communication (NFC), RFID protocols or standards, etc.

"Direction finder or DF or Device" refers to a device which is used to determine the relative direction to a target as defined hereinunder. Alternatively the device is used to find whether one or more targets are located within a desired direction from the finder. Said DF can be a stand-alone device or integrated into another electronic device—such as, but not limited to, cellular phone, video game controllers/console, digital camera, GPS device, media player, laptop computer, tablet computer, wireless remote control, PDA—either via software or hardware or a combination of both.

"Target"—Target refers to a wireless communication device, or an RF communication source, which comprises RF transmitter and/or receiver and/or repeater or transponder and/or tag, which communicates wirelessly directly (i.e., not via relays) with the DF.

"Identification Data or ID"—refers to a number, either serial or other, a name, a collection of symbols, or any other type of reference, or data, or information which is used to provide the target a unique identification.

"Landmark"—refers to a stationary Target which is by default not mobile (for example, a Wi-Fi router), and that is identifiable by other wireless devices, and which is associated with a physical location in which it is located (for example, a Starbucks Wi-Fi router).

"Mark"—refers to a Target of any type—stationary or mobile, that a user selects it to be used as a reference for direction and/or distance and/or height difference from other targets (for example, using another user as a relative Landmark for other targets)

"Peer-2-peer" or "P2P"—refers to a Wireless Communication network between at least 2 wireless devices, which allows wireless devices to directly communicate with each other. Said Wireless devices within range of each other can discover and communicate directly without involving central access points, relays, cell towers, routers, etc.

"Navigation"—means the guidance of a person, device or any transportation mean from place to place, person to person, person to place, etc. . . . .

"Mapping"—means the creation of a set of directions and/or distances and/or height differences to Targets from a Direction-Finder and/or from each such target to the other targets.

"Accelerometer"—a device that measures proper acceleration—i.e., the acceleration experienced relative to free-fall. Single- and multi-axis models are available to detect magnitude and direction of the acceleration as a vector quantity, and can be used to sense position, vibration and shock. Said accelerometer can be a component and/or sensor in portable electronic devices—such as, but not limited to, cellular phone, video game controllers/console, digital camera, GPS device, media player, laptop computer, tablet computer, wireless remote control, PDA—to detect the position of the device or provide for game input.

"Gyroscope"—shall mean a device for measuring or maintaining orientation, based on the principles of conservation of angular momentum. Said Gyroscope can be a component and/or sensor in portable electronic devices—such as, but not limited to, cellular phone, video game controllers/console, digital camera, GPS device, media player, laptop computer, tablet computer, wireless remote control, PDA—to detect the position of the device or provide for game input.

"Tilt sensor"—shall mean device and/or component that can measure the tilt angle of a plane in two axes, in portable electronic devices—such as, but not limited to, cellular phone, video game controllers/console, digital camera, GPS device, media player, laptop computer, tablet computer, wireless remote control, PDA—to detect the position of the device or provide for game input. The examples given in the present invention assume a tilt sensor in the form of an accelerometer, however, other types of tilt sensors known in the art (for example, gyro) may be used.

"Level/Floor"—shall mean a horizontal virtual and/or physical line and/or space and/or surface and/or position; the use of this term is intuitive by nature and it is within the intention of this invention to use it in the broadest possible meaning. It is not meant to be used only as limited to an accurate horizon.

"Filtering"—shall means parameters and/or categories and/or a program and/or routine that blocks access or grant access to data that meet a particular criterion, and/or that sort data, and/or screen that data and/or screen/sort Broadcasting devices;

"UI"—shall mean a program that controls a display for the user (usually on a computer/electronic device monitor/screen/any other display mean) and that allows the user to interact with the system.

"Broadcasting Device"—shall refer to any type of device that have Wireless Communication capabilities (transmit and/or receive), at any given protocol and/or frequency and/or standard and/or specification, whether these wireless communication capabilities are integrated in the device or connected to it in any way—wired or wireless.

"Searching Device"—shall mean a Broadcasting device that uses filtering to distinguish between Broadcasting devices around it.

"Relative Location"—shall mean the direction and distance and optionally also the elevation difference from the DF to a Target, or to a Landmark, or to a Mark, or between them all. It may also include height difference.

For the sake of better clarity, and before describing the present invention, the invention of WO 2009/147662 will be repeated herein.

The Invention of WO 2009/147662

The invention of WO 2009/147662 relates to method and system for detecting by a direction finder device (hereinafter referred to as DF) the direction to one or more wireless communication sources, hereinafter referred to as "targets". More specifically, the invention of WO 2009/147662 provides means for determining whether one or more targets are located within a sector of interest. The invention of WO 2009/147662 does not consider, or depends on the received signal or wave attributes, such as amplitude, phase, time of arrival, or any other technical attribute. In other terms, The invention of WO 2009/147662 obtains said direction finding without performing any wave analysis. Rather than that, said invention is based on wireless communication existence or no existence, and induced wireless communication loss between the DF and the target.

FIG. 1 shows a direction finder 10 according to an embodiment of WO 2009/147662 whose object is to determine those targets 100a, 100b, 100c . . . etc. that are located within a sector of interest 20, and optionally also to provide indication as to the proximity of each target to the central axis 21 of the direction sector of interest 20. Each of the targets is a wireless communication source which is an RF transmitter or transceiver, repeater or transponder or a tag whose existence and/or ID and or direction has to be found by the DF. As noted above, the invention of WO 2009/147662 performs said tasks without relying on any of the wave or signal properties.

Figure 2:
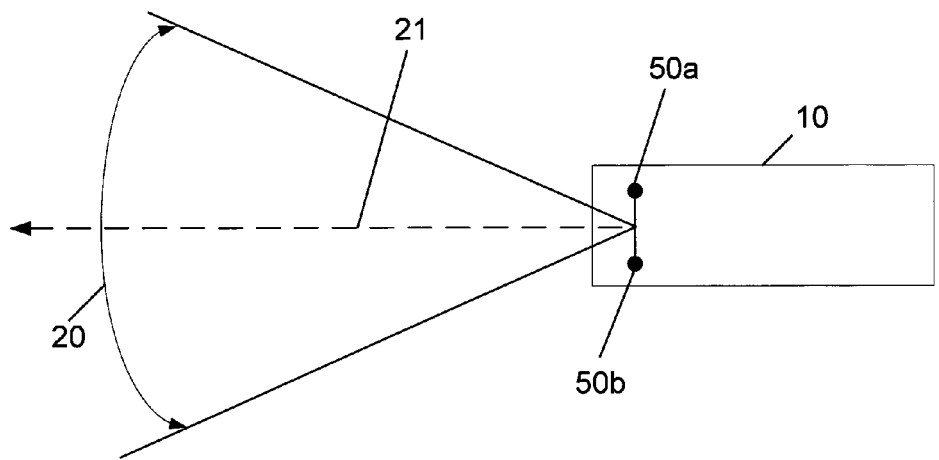
FIG. 2 shows a direction finder according to an embodiment of WO 2009/147662, which comprises two antennas that are arranged in a broad-side configuration.

FIG. 2 shows a direction finder 10 according to one embodiment of WO 2009/147662. The direction finder 10 comprises two antennas 50a and 50b that are arranged in a broad-side configuration, i.e., the central axis of the sector of interest is perpendicular to the line connecting the two antennas. Typical distance between the antennas is a quarter of the wavelength $\lambda$, and usually not more than half the wavelength $\lambda$.

The direction finding of WO 2009/147662 is based on the use of two antenna patterns, which will be referred herein as "reference" and "null" patterns (R and N respectively). The direction finding is performed in three major stages. The first stage ("stage 1") is performed while the reference pattern is generated, and the second stage ("stage 2") is performed while the null pattern is generated. In a third stage, a comparison between the previous patterns is made to infer if the target is within the sector of interest.

Figure 3:
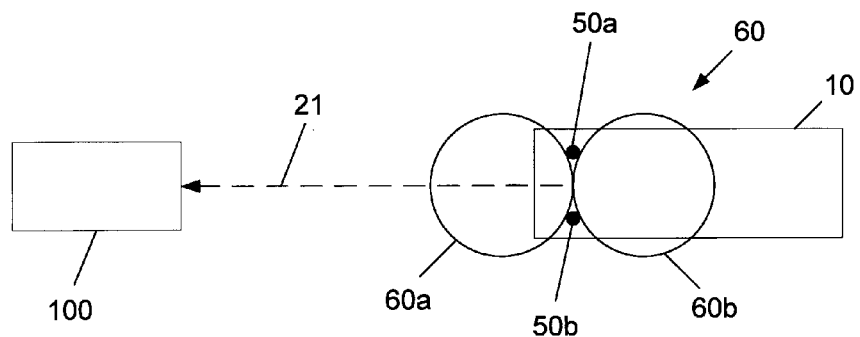
FIG. 3 shows the general form of the in-phase reference pattern, according to an embodiment of WO 2009/147662.

FIG. 3 shows the general form of the reference pattern. The reference pattern 60 is generated by an in-phase combination of the signals of the two antennas 50a and 50b, which forms an "8-shaped" pattern that comprises a front lobe 60a, and back lobe 60b. The front lobe 60a is directed toward central axis 21.

Figure 4:
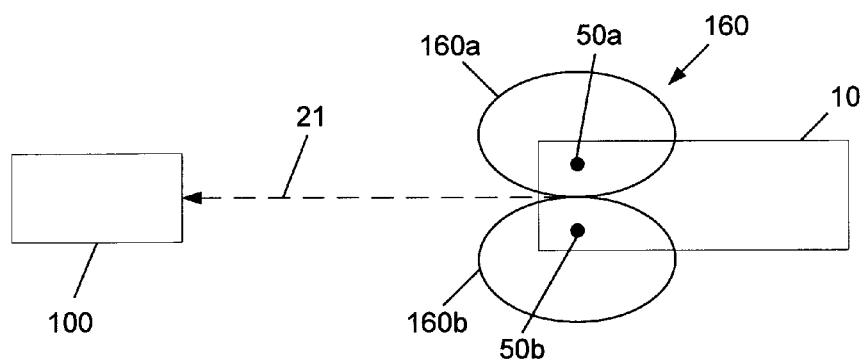
FIG. 4 shows the general form of the out-of-phase null pattern, according to an embodiment of WO 2009/147662.

FIG. 4 shows the general form of the null pattern. The null pattern 160 is generated by an out-of-phase combination of the signals of the two antennas 50a and 50b, which also forms an "8-shaped" pattern which is rotated by 90° with respect to the reference pattern of FIG. 3. The null pattern also comprises upper lobe 160a, and lower lobe 160b. The null between said two lobes is directed towards the central axis 21.

Figure 5:
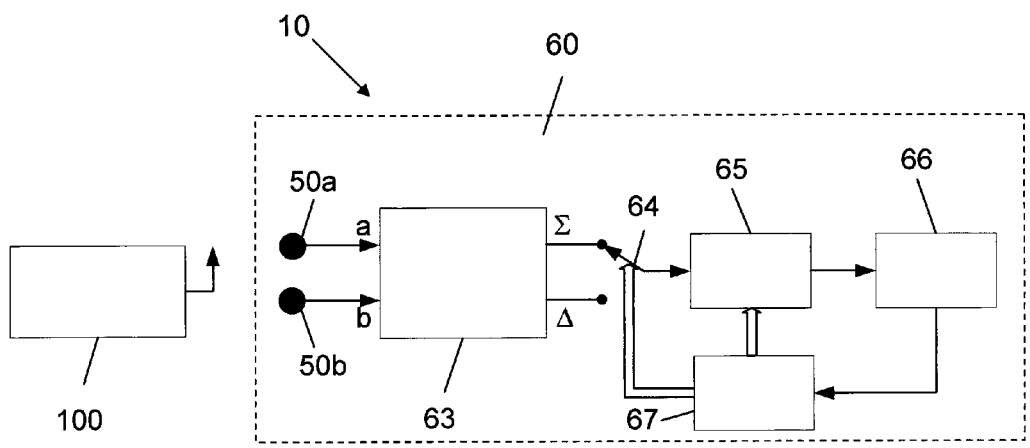
FIG. 5 illustrates a general structure of the direction finder, according to a first hardware embodiment of WO 2009/147662.

FIG. 5 illustrates the general structure of the direction finder 10, according to a first hardware embodiment of WO 2009/147662. The direction finder comprises a conventional wireless communication unit 66 that communicates with a similar wireless communication unit (not shown) of the target 100. The 180° hybrid junction 63 is used to generate the reference and null patterns 60 and 160 (of FIGS. 3 and 4) respectively. The hybrid junction 63 is connected at its port a to antenna 50a, and at its port b to antenna 50b. The reference (i.e., in-phase) pattern 60 is generated at the Σ (sum) port and the null (i.e., out-of-phase) pattern 160 is generated at the Δ (difference) port. Switch 64 selects between the usage of the reference pattern at the first stage, and the usage of the null pattern at the second stage. Controlled attenuator 65, which is an essential element of the invention of WO 2009/147662, is used for indirect measurement of the relevant antenna pattern value at the direction of the target, using a communication yes/no principle. More specifically, the communication yes/no principle operates as follows: Processing unit 67 accepts from the wireless communication unit 66 the information whether communication with target 100 exists or not. The processing unit controls switch 64, and controlled attenuator 65 according to the following DF procedure. First, in stage 1 the attenuation of attenuator 65 is set to 0 dB, and a communication between the wireless communication units of the direction finder 66 and the target is established. Establishment of communication is regarded as "yes" when data handshake between the two wireless communication units is acquired. Loss of communication, i.e., "no" communication is regarded when data transfer between the two wireless communication does not exist, for example, due to loss of handshake. Attenuation in the wireless communication path is deliberately introduced by controlled attenuator 65 until communication is lost. More specifically, the attenuation is gradually increased, until loss of communication. In stage 1, i.e., when the reference pattern is used, the minimal attenuation required to lose communication is recorded, and noted R in dB units. Similarly, by switching switch 64 from Σ to Δ port in stage 2, i.e., when the null pattern is used, the minimal attenuation required to lose communication is recorded also, and noted N in dB units. The values of R and N directly depend on the direction to the target, and on the active pattern (i.e., the pattern which is used at that time).

Figure 6A:
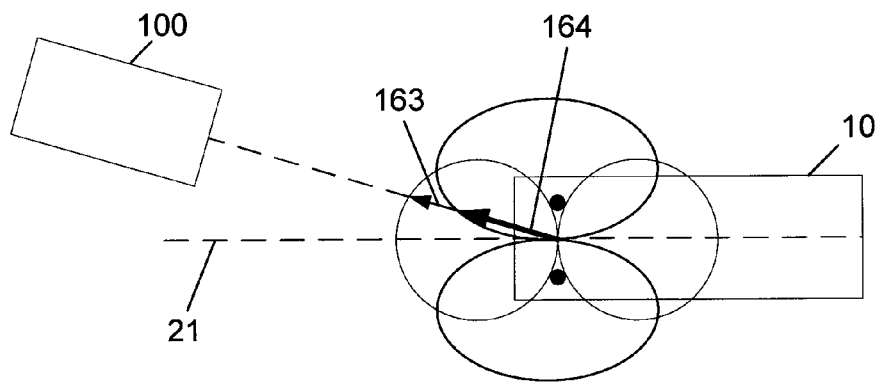
FIG. 6a shows a situation in WO 2009/147662 when a target is positioned off the central axis of the direction sector of interest during generation of reference and null patterns respectively, and the corresponding vectors R and N that represent the attenuation which is required to lose communication in each of said cases.
Figure 6B:
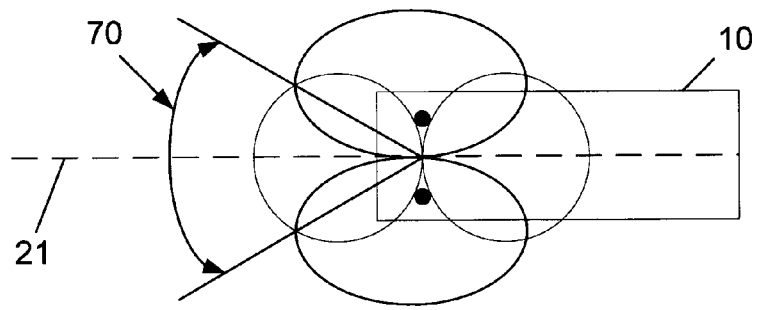
FIG. 6b shows the sector in which (R−N≥0), relative to the reference and null patterns respectively, as in WO 2009/147662.

FIG. 6a shows a situation in WO 2009/147662 in which target 100 is positioned off the central axis 21. In that case, the vector 163 represents the R attenuation required to lose communication in stage 1. The closer the direction of target 100 to the central axis 21, the larger R value becomes. Similarly vector 164 represents the N attenuation required to lose communication in stage 2. However, in stage 2, the closer the direction of target 100 to the central axis 21, the smaller N value becomes. When the direction to target 100 coincides with axis 21, R becomes maximal, and N becomes minimal. On the other hand, when the direction to target 100 is 90° off the central axis 21, N becomes maximal, and R becomes minimal. FIG. 6b shows the sector 70 in which (R−N≥0). The larger the difference R−N is, the closer the target direction to the central axis 21 is. The definition of the sector width can be controlled by requiring R−N≥X. When X≥0, the sector 70 width is narrowed, and when X≤the sector width is broadened.

Figure 7:
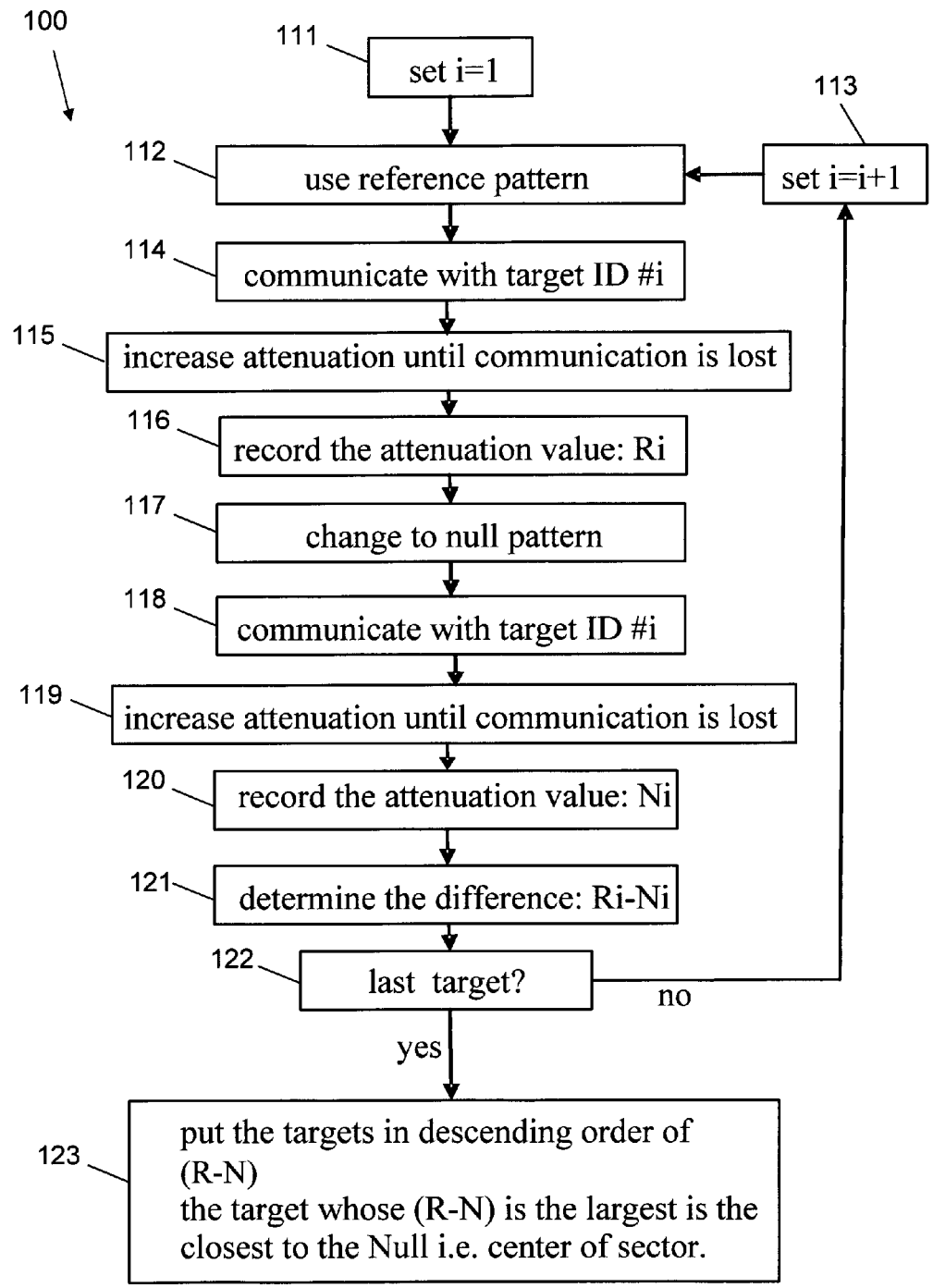
FIG. 7 is a flow diagram as in WO 2009/147662 for determining the direction to a target when several targets are present.

FIG. 7 is a flow diagram illustrating a procedure 100 for determining the direction when several targets are present (i.e., having wireless communication directly with the DF), according to WO 2009/147662. In step 111, an index i, which represents a number which is assigned to each target ID, is set to 1. Next, the reference pattern is activated in step 112, by switching switch 64 (FIG. 5) to the Σ position. In step 114, a communication is established with a target #i. Next, in step 115, the attenuation is increased until loss of communication, and in step 116, the attenuation value R corresponding to the point of loss of wireless communication is recorded. In step 117, switch 64 is turned to the position, the attenuation is zeroed, and again communication is established in step 118 with target #i using a null pattern. In step 119, the attenuation is again increased until loss of communication. In step 120 the attenuation value N corresponding to the point of loss of wireless communication is recorded. In step 121, the value of Ri−Ni is determined, and recorded. In step 122, the procedure checks whether all targets have bean treated. In the negative case, the index i is increased by 1 in step 113, and the procedure repeats from step 112 for the new target corresponding to the present I (of step 113). If, however, the answer in step 122 is yes, an analysis of all recorded values of Ri−Ni is performed in step 123. More specifically, in step 123 the targets are arranged in descending order according to their determined Ri−Ni values. Furthermore, it can be concluded that the target with index i whose Ri−Ni value is largest, is the closest to the sector central axis 21.

Figure 8:
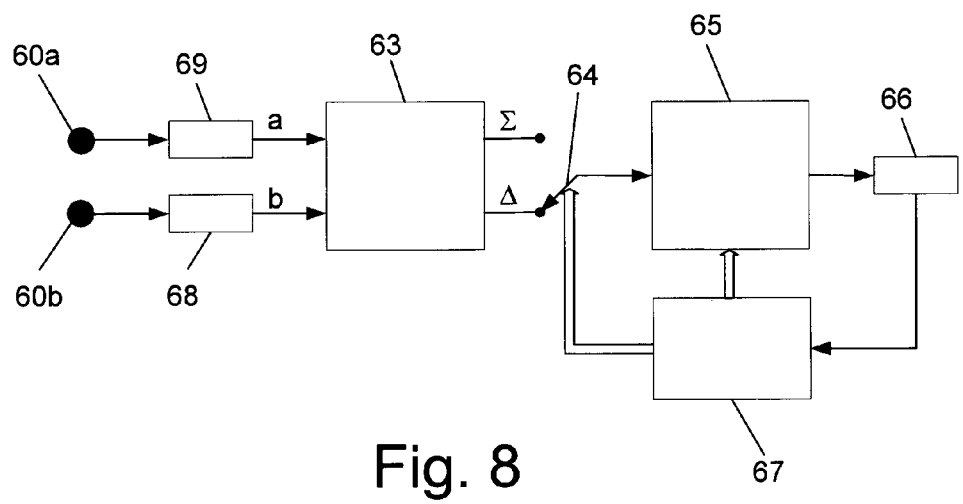
FIG. 8 shows a direction finder according to an embodiment of WO 2009/147662, which comprises elements for compensating for amplitude and phase differences in the antennas or other elements, thereby to respectively cause a deep null pattern which coincides with the central axis of the direction sector of interest.

WO 2009/147662 mentions that in practical situations the signals at antennas 50a and 50b, are not necessarily equal in amplitude and phase when communicating along axis 21. Moreover, cables from the antennas are not necessarily equal, and the 180° hybrid junction 63 is not perfect. This may result in null pattern whose null shifted off the axis 21, and/or the null depth is not maximized. The null depth is the difference in dB between the highest and the lowest values in an antenna pattern. To adjust the best possible null depth and/or the null position with respect to the central axis 21 of the direction finder, one or combination of the following additional components may be added to the direction finder, as shown in FIG. 8:

A Voltage Variable Attenuator—VVA 69: This component compensates for any amplitude difference in the antennas or other elements to acquire a deep null;

A phase shifter 68—This component compensates for any phase difference in the antennas or other elements to acquire a null coinciding with axis 21.

Figure 9:
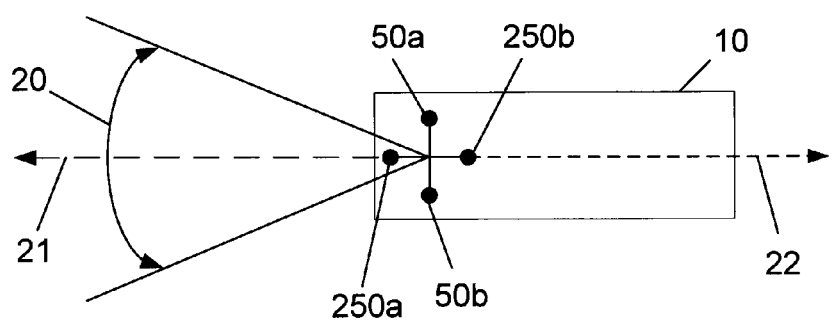
FIG. 9 shows an embodiment of WO 2009/147662 which further comprises two additional antennas in an end-fire configuration for performing front and back detection discrimination.
Figure 10A:
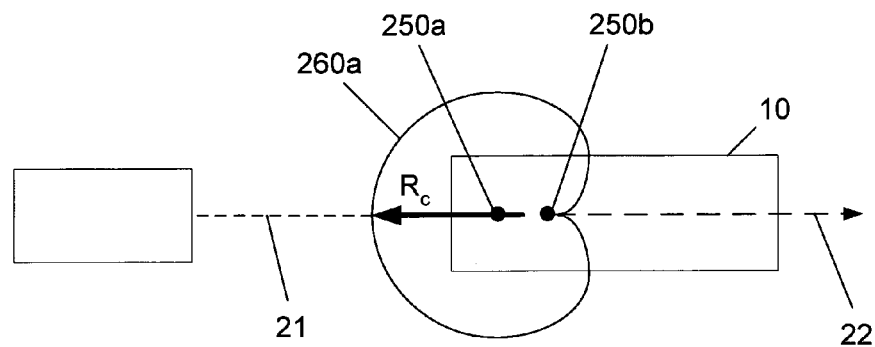
FIG. 10a shows the general form of a cardioid reference pattern as in WO 2009/147662 which is generated by an additional 90°-phase shift to the front antenna in order to provide front vs. back discrimination.
Figure 10B:
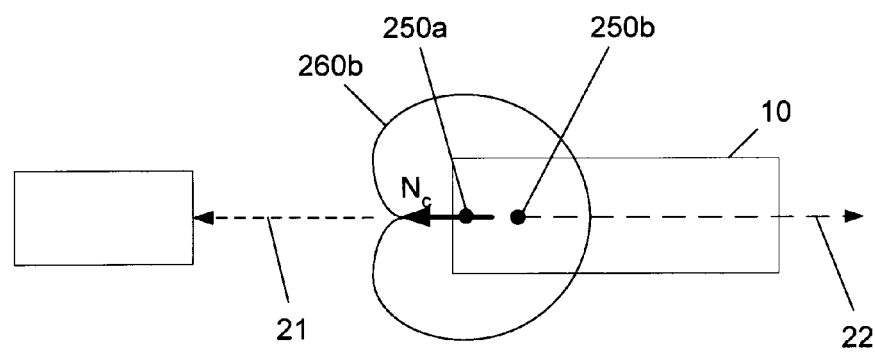
FIG. 10b shows the general form of a cardioid null pattern of WO 2009/147662 which is generated by an additional 90°-phase shift to the back antenna in order to provide front vs. back discrimination.

The procedure of WO 2009/147662 as thus far described enables the finding of targets that are located within sector 20 (see FIG. 1). However, this procedure generally cannot discriminate between targets that are located in front of the direction finder 10 and those that are located to the back of the direction finder 10, i.e., in the direction of arrow 22 (in FIG. 1). If a front vs. back discrimination is required, the following procedure may be performed. As shown in FIG. 9 of WO 2009/147662, two additional antennas 250a and 250b are added to the direction finder 10 in an end-fire configuration, i.e., the central axis 21 of the sector of interest coincides with the line connecting the two antennas 250a and 250b. As shown in FIGS. 10a and 10b of WO 2009/147662, in addition to the abovementioned reference and null patterns 60 and 160 that are produced in stages 1 and 2 using antennas 50a and 50b respectively, "cardioid" type antenna patterns 260a and 260b are generated in stages 3 and 4 using antennas 250a and 250b. FIG. 10a shows the general form of the cardioid reference pattern 260a as in WO 2009/147662. In stage 3, the cardioid reference pattern is generated by an additional 90°-phase shift to the front antenna 250a. The cardioid pattern comprises a lobe, which is directed toward central axis 21, and a null directed to the back axis 22. FIG. 10b shows the general form of the cardioid null pattern 260b. In stage 4, the cardioid null pattern is generated by an additional 90°-phase shift to the back antenna 250b. The cardioid pattern comprises a lobe, which is directed toward back axis 22, and a null directed to the front axis 21. The procedure as above described with respect to the generation of the vectors R and N is repeated in the cardioid stages 3 and 4. In stage 3, i.e., when the cardioid reference pattern 260a is generated, the minimal attenuation required to lose communication is recorded, and denoted $R_c$ in dB units. Similarly, in stage 4, when the cardioid null pattern is generated, the minimal attenuation required to lose communication is also recorded, and denoted $N_c$ in dB units. The values of $R_c$ and $N_c$ directly depend on whether the direction to the target is in the front or the back (i.e., to the direction of axis 21 or axis 22). If $R_c > N_c$, it is concluded that the target is in the front of the DF 10. Otherwise, If $R_c < N_e$, it is concluded that the target is in the back of the DF 10.

Figure 11:
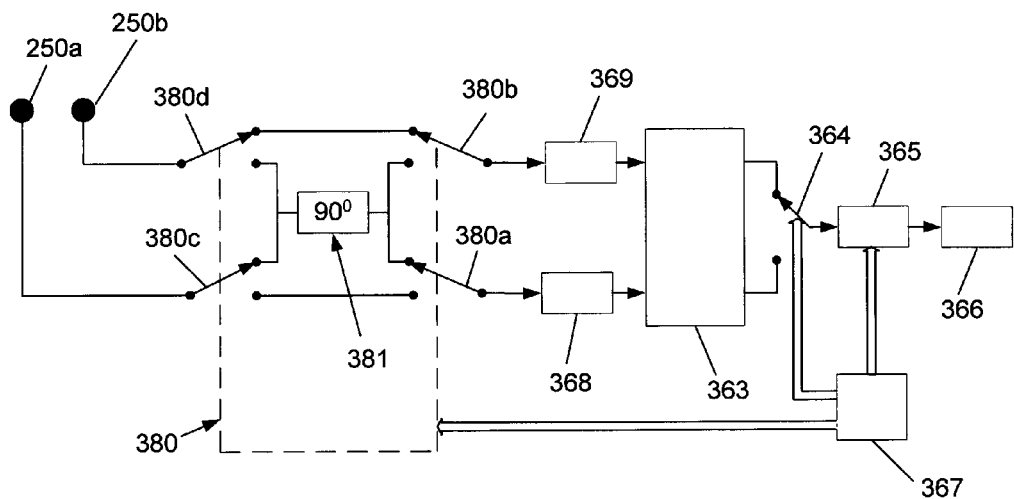
FIG. 11 illustrates in a block diagram form the general structure of a directional finder according to WO 2009/147662 having a front and back discrimination, as described with respect to FIGS. 9, 10a and 10b.

FIG. 11 illustrates in a block diagram form the general structure of the directional finder of WO 2009/147662 having a front and back discrimination, as described with respect to FIGS. 9, 10a and 10b. In stage 3, switch 380 is connected in the position as shown in the figure, thus introducing an additional 90° phase shifter 381 in the path of the front antenna 250a, thereby to generate the cardioid shown in FIG. 10a. In stage 4, switch 380 is turned to the lower position shown in the figure, thus introducing the additional 90° phase shifter 381 in the path of the back antenna 250b, thereby to generate the cardioid of FIG. 10b. Processing unit 367, in addition to controlling the switch 364 and controlled attenuator 365, controls the switch 380 according to procedure described above. The rest of the elements in the figure, i.e., elements 363, 364, 365, 366, 368, and 369 are essentially the same elements 63, 64, 65, 66, 68, and 69 as discussed above.

Alternate embodiments of WO 2009/147662 for acquiring the 90° phase shift are: (a) including a 90° phase shift for stage 3 and 270° phase shift for stage 4 as part of phase shifter 368; and (b) using a quadrature, i.e., 90° hybrid junction instead of the 180° hybrid junction 363.

Figure 12:
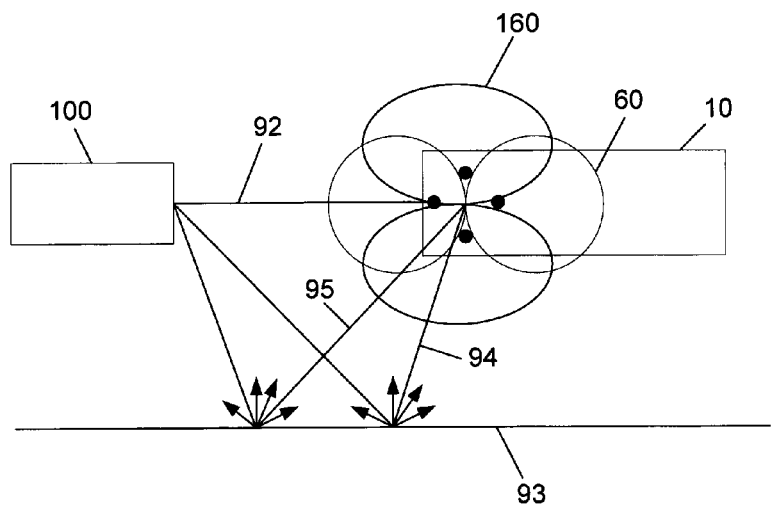
FIG. 12 illustrates how the invention of WO 2009/147662 overcomes reflected waves that arrive to the direction finder of the present invention.

In various situations, reflection of waves is expected from nearby objects, such as walls, or metallic objects. As shown in FIG. 12 of WO 2009/147662, waves transmitted from target 100 may be scattered and reflected from nearby object such as wall 93, and arrive the direction finder 10 via many waves two of which 94 and 95 are shown in the figure. In contrast to the direct wave 92, the reflected waves are much weaker due to the following facts: (a) the reflected waves travel a loner path; (b) The reflected waves are scattered to many directions; and (c) the reflected waves from an object suffer from reflection losses. The reflected waves arrive at the DF later than the direct wave due to the longer path. These reflections are combined with the direct wave 92, distorting the amplitude, phase, and time of arrival of the signal. In prior art DF techniques that are based on measuring the signals amplitude, phase, or time of arrival, these multi-path reflections cause severe errors in the direction finding. A key novel feature of the invention of WO 2009/147662 is its ability to overcome multi-path reflections because the direction finding is based on the deliberate loss of communication concept, rather than measuring these signal attributes. The facts that the reflected waves are weaker than the direct wave 92 and that they are non-coherent, do not affect the existence of communication between the DF and the target. As noted above, the existence or non-existence of communication is the basis of the invention of WO 2009/147662, rather than any specific characteristic of the arrived signal. As mentioned above, the DF procedure of WO 2009/147662 is based on the difference R−N rather than absolute values of received signal levels, and therefore the procedure of the invention of WO 2009/147662 is also not affected by the distance between the target and the DF, as long as they can communicate.

Figure 13:
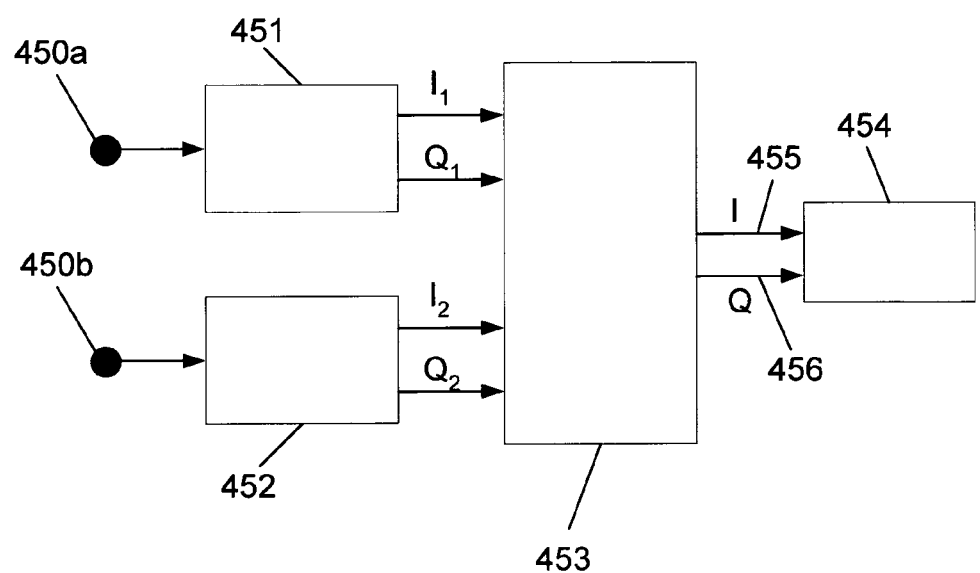
FIG. 13 illustrates in block diagram form the software based implementation of WO 2009/147662.

In yet another embodiment of WO 2009/147662, the DF technique as described above is implemented by software rather than hardware. In this embodiment, the same reference and null patterns of stages 1 and 2 respectively as mentioned with respect to FIGS. 3 and 4 are generated digitally. FIG. 13 generally illustrates in block diagram form the structure of the software based implementation. The first antenna 450a is connected to a first RF channel (radio receiver) 451. The second antenna 450b is connected to a second RF channel (radio receiver) 452. The ADC (Analogue to Digital Converter—not shown) (which may be a part of the radio receiver, or separate thereof) outputs of the RF channels are named the I/Q (In-phase/Quadrature) ports. The first RF channel 451 outputs are denoted $I_1$ and $Q_1$. The second RF channel 452 outputs are denoted $I_2$ and $Q_2$. Processing unit 453 receives $I_1$ and $I_2$ and $Q_1$ and $Q_2$ inputs, performs the direction finding technique by calculating new I and Q based on said inputs, and conveys over lines 455 and 456 respectively the newly calculated I and Q to the base-band component 454. In stage 1, the reference pattern is digitally generated by the sums $I=I_R=I_1+I_2$ and $Q=Q_R=Q_1+Q_2$. In stage 2. the null pattern is digitally generated by the differences $I=I_N=I_1-I_2$ and $Q=Q_N=Q_1-Q_2$. The deliberate attenuation which is performed in the hardware embodiment by the controlled attenuator 65, is replaced herein by a digital attenuation of the received signals represented by $I_1$, $Q_1$, and $I_2$, $Q_2$. In stage 1 the values of $I_R$ and $Q_R$ are reduced simultaneously, and in stage 2 the values of $I_N$ and $Q_N$ are reduced simultaneously. In stage 3 the values of $I_{Rc}$ and $Q_{Rc}$ are reduced simultaneously, and in stage 4, the values of $I_{Nc}$ and $Q_{Nc}$ are reduced simultaneously. The compensation for any amplitude and phase difference which was performed in the hardware implementation by VVA 69 and phase shifter 68, is performed in the software implementation digitally by adding correction factors I', Q', I", and Q", where the correction factors are digital values, that are either positive or negative. More specifically in stage 1, $I=I_R=I_1+I_2+I'$, and $Q=Q_R=Q_1+Q_2+Q'$. In stage 2 $I_N=I_1-I_2+I"$, and $Q_N=Q_1-Q_2+Q"$. In stages 3 and 4 the additional 90° phase shift is performed in a similar way by adding or subtracting digitally the respective factors. More specifically, in stage 3, $I=I_{Rc}=I_1-Q_2+I'''$ and $Q=Q_{Rc}=I_2+Q_1+Q'''$ and in stage 4, $I=I_{Nc}=I_1+Q_2+I''''$ and $Q=Q_{Nc}=Q_1-I_2+Q''''$. Correction factors I''', Q''', I'''', and Q'''' are added in a similar manner to stages 1 and 2 for any amplitude and phase difference. It should be noted that all the discussions throughout WO 2009/147662 with respect to FIGS. 1, 2, 3, 4, 6a, 6b, 7, 9, 10a, 10b, 12, and 13 are applicable also for the software embodiment of WO 2009/147662.

It should be noted that the novelty of the hardware implementation of WO 2009/147662 generally resides in all the elements of FIGS. 5, and 8, excluding the wireless communication unit 66. The novelty of the hardware implementation of FIG. 11 of WO 2009/147662 generally resides in all the elements shown in the figure, excluding the wireless communication unit 366. The novelty of the software implementation of FIG. 13 essentially resides in the processing unit 453.

As has been shown, the invention of WO 2009/147662 provides a procedure for finding the direction to one or more targets, which is based on yes/no communication. The type of communication used between the direction finder and the target is generally irrelevant to the invention of WO 2009/147662, as long as a wireless communication is maintained during a "yes" communications state, and a loss of wireless communication occurs during a "no" communication state. The procedure of WO 2009/147662 uses an attenuator which intentionally causes loss of communication, wherein the attenuator may attenuate the received signal, the transmitted signal or both. The invention of WO 2009/147662 determines the difference between the reference pattern and the null pattern in order to find if a target is within a sector of interest. The reference pattern may be directional or omni-directional. The invention of WO 2009/147662 uses at least two antennas, typically omni-directional but also may be directional, for finding the direction. For the reference pattern, also a single antenna may be used. The deliberately induced attenuation (either by the controlled attenuators 65 or 365 in the hardware embodiments, or digital attenuation in the software embodiments) may be performed gradually, or according to a search algorithm. In addition, the order by which the reference and null patterns are generated is replaceable. Furthermore, the attenuation may start with the highest value where communication does not exist, towards communication existence. It should also be noted that the target is not required to be equipped with direction finding, but it may include such a feature.

The description above with respect to FIGS. 1-13 illustrates the invention of WO 2009/147662. This description of WO 2009/147662 has been brought for assisting in understanding the background to the present invention, and as several steps from the techniques of WO 2009/147662 are used within the present invention. The following description relates to embodiments of the present invention.

The Present Invention

The present invention will now be described in detail.

Figure 14A:
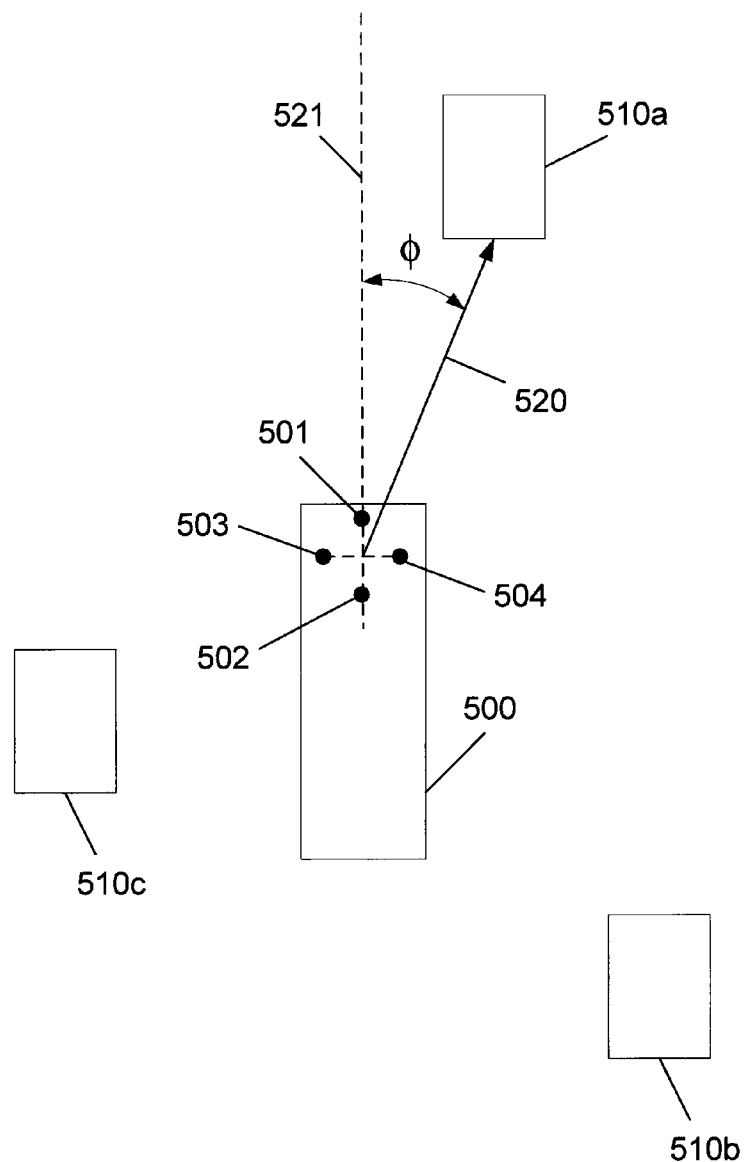
FIG. 14a describes a four-antenna arrangement for determining the direction from a direction finder (DF) 500 to a target device, according to one embodiment of the invention.

A four-antenna arrangement for determining the direction from a direction finder (DF) 500 to a target device is described in FIG. 14a. As before, the DF has a central axis 521. However, in contrast to the DF of WO 2009/147662 where the DF determines whether a target is located within a predetermined sector, the arrangement of the present invention enables determination of the direction $\phi$ to a target 510 (several targets 510a, 510b, 510c . . . etc. are shown in the figure). This direction $\phi$ is defined with respect to central axis 521 of the DF. The four antennas 501, 502, 503, and 504 are arranged in a Quadrangle configuration. In one preferred, rhombus configuration which is shown in the figure, the two antennas 501 and 502 are positioned on the central axis 521, and the two other antennas, namely 503 and 504 are positioned on an axis perpendicular to central axis 521. The typical distance between antennas 501 and 502 is a quarter of communication wavelength $\lambda$, and usually not more than half the wavelength $\lambda$. Similarly, the typical distance between antennas 503 and 504 is a quarter of the wavelength $\lambda$, and usually not more than half the wavelength $\lambda$. The direction finding of this invention is based on the comparison of R and N, said R and N are the values of the respective attenuations required to lose communication between the DF and the target using a first and second cardioid antenna patterns respectively. Each of the R and N attenuation values is respectively used as an indirect measurement of the cardioid antenna pattern at the direction to the target. The direction to the target is derived by comparing R to N. Techniques for generating cardioid patterns by combining two signals from two antennas, that involve adding or subtracting 90° in software or hardware are described in WO 2009/147662 (the description relating to FIGS. 11 and 13).

Figure 15A:
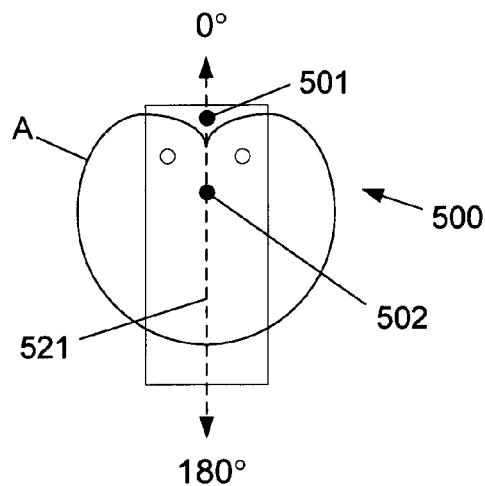
FIGS. 15a, 15b, 15c, and 15d show four antenna patterns respectively of the direction finding, according to an embodiment of the present invention.
Figure 15B:
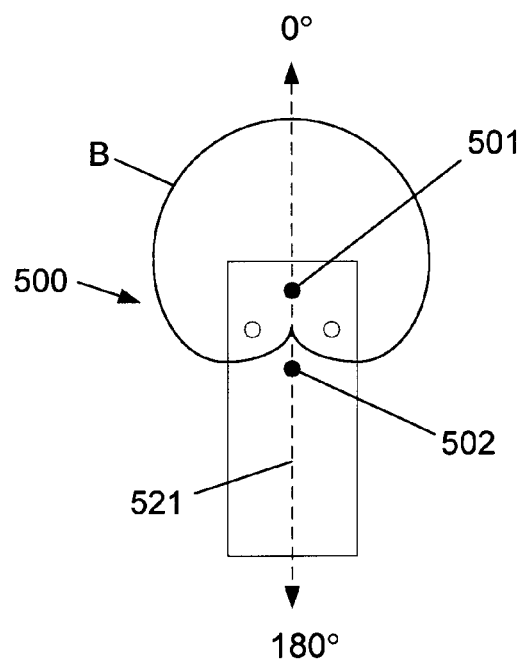

A basic (2D) direction finding is performed in nine stages, while holding the DF 500 essentially horizontally. The first stage ("stage 1") is performed while a first cardioid pattern A in the direction of 0° as shown in FIG. 15a is generated using antennas 501 and 502, resulting in determining a first attenuation value $R_A$. Hereinafter, a "0° antenna pattern" denotes an antenna pattern whose notch directs to the 0° direction as in FIG. 15a. A second stage ("stage 2") is performed while a second cardioid pattern B (a "180° antenna pattern") as shown in FIG. 15b is generated using antennas 501 and 502, resulting in determining a second attenuation value $N_B$. In a third stage ("stage 3") the relation between $R_A$ and $N_B$ (for example, $R_A - N_B$ or $R_A/N_B$) is calculated. In stage 4, one or more possible values for the direction $\phi$ to the target as a function of $R_A$ and $N_B$ are obtained from a first lookup table (or equation). The correct direction $\phi$ from among those found is determined in subsequent stages.

Example

Figure 15C:
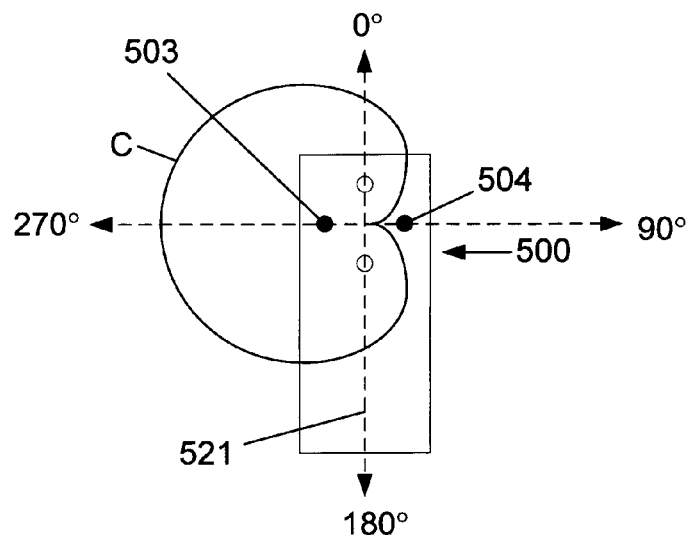
Figure 15D:
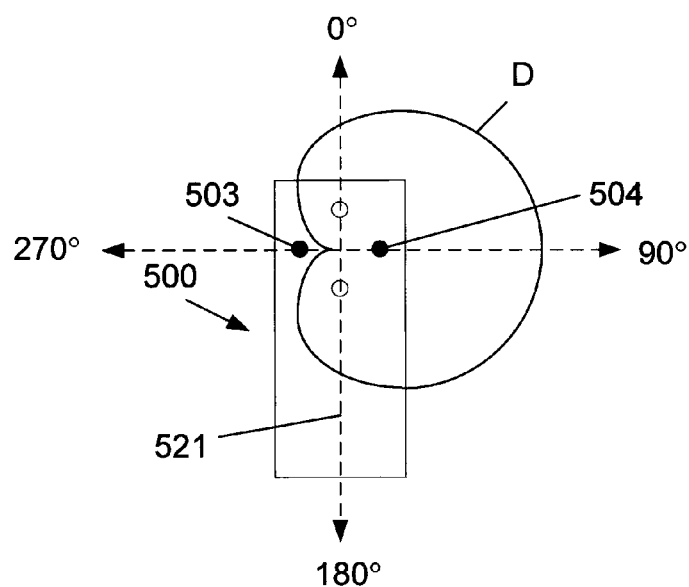
Figure 15E:
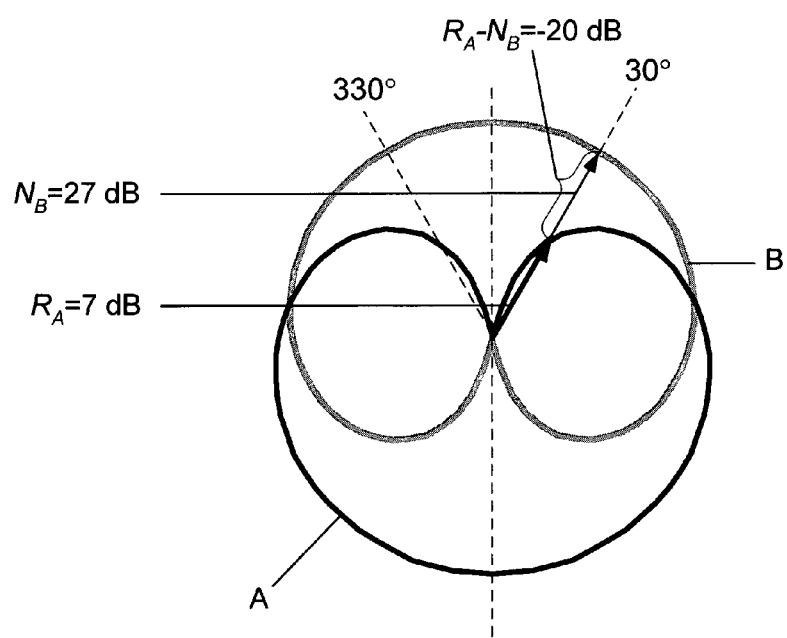
FIG. 15e shows an example for a direction finding according to one embodiment of the invention.

The example of FIG. 15e illustrates the process above, relating to an R-N principle as applied with respect to a target in the direction of 30°. The cardioids A and B are shown, and they are essentially the same as the cardioids of FIGS. 15a and 15b respectively. The cardioid A pattern gain is small and therefore relatively small amount attenuation is required to lose communication, e.g., $R_A = 7$ dB. The cardioid B pattern gain is much larger and therefore relatively large amount of attenuation is required to lose communication, e.g., $N_B = 27$ dB. The difference $R_A - N_B = 7 - 27 = -20$ dB, indicates that such a difference between the two vectors R and N can occur only in two directions, i.e., 30° (as shown) or 330° (not shown in the figure). Therefore, already in this stage the procedure can conclude that target is either in the direction of 30° or 330° (for the sake of clarity only the vectors in the 30° direction are shown). This ambiguity will be resolved in the following stages.

Stage 5 is performed while a third cardioid pattern C (a 90° antenna pattern) as shown in FIG. 15c is generated using antennas 503 and 504, resulting in determining a third attenuation value $R_C$. Stage 6 is performed while a fourth cardioid pattern D (a 270° antenna pattern) as shown in FIG. 15d is generated using antennas 503 and 504, resulting in determining a fourth attenuation value $N_D$. In stage 7, the relation between $R_C$ and $N_D$ (for example, $R_C - N_D$ or $R_C/N_D$) is calculated. In stage 8, one or more possible values for the direction $\phi$ to the target as a function of $R_C$ and $N_D$ are obtained from a second lookup table (or equation). In stage 9, the correct value of $\phi$ is determined by comparing those values that have been obtained in stage 4 with the values that have been obtained in stage 8.

Figure 15F:
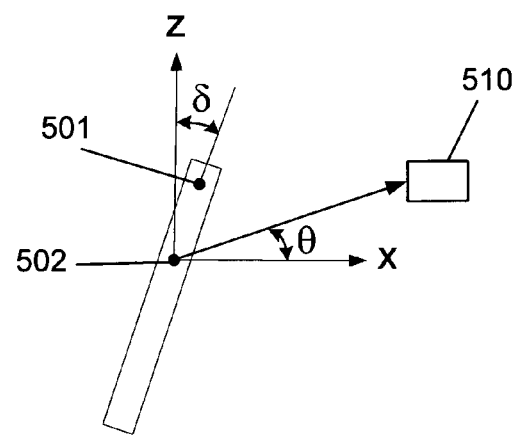
FIG. 15f shows the finding of an elevation angle to a target, according to one embodiment of the invention.

As mentioned, the above stages 1-9, that are performed while the DF is held essentially horizontally, determine the direction to targets 510 in a horizontal plane (i.e., these stages refer to a 2D determination). When the target elevation angle with respect to the DF is desired for a 3D application, the previous stages 1-3 are repeated in stages 10-12 while holding the device essentially vertically (FIG. 15f shows a side view of device 500 in which the device is held close to vertical). In stage 13 (which corresponds to original stage 4), one or more possible values for the elevation angle $\theta$ to the target with respect to an axis z perpendicular to the plane of the device as a function of $R_A$ and $N_B$ are obtained from a third lookup table (or equation). As the DF may be held with a certain tilt angle δ with respect to the zenith (as shown in FIG. 15f), the measured elevation angle θ may be adjusted by adding or subtracting the tilt angle of the DF to determine the true target elevation angle with respect to the horizon. The tilt angle of the DF may be derived, for example, by using a tilt sensor of any type, such as an accelerometer, Gyroscope, etc. which is positioned on the DF. For convenience purposes, the following description will use an accelerometer, but any other type of tilt sensor may be used. Furthermore, when the device is not held perfectly horizontally (during a 2D direction finding), the true direction to the target in the horizontal plane may be found by adjusting the measured angle φ using the tilt angle δ.

Optional stages 14-17 may also be performed, repeating stages 1-4, while using a pair of antennas from the antenna arrangement that are located on a diagonal, such as antennas 501 and 503, or 501 and 504, etc, and while using additional lookup tables. These stages may be performed for the purpose of verification, or for increasing the measurement accuracy.

As mentioned above, a tilt sensor (such as accelerometer) is used within the DF in stages 10-13 to measure the tilt angle of the device, for determining the true elevation angle when the device is not held perfectly vertical. This tilt sensor may be used for still another purpose. As the tilt sensor continuously measures the orientation angle of the DF with respect to the horizon, it can be used to select the operation mode of the device. For example, if the measured angle by the tilt sensor is 0°±x° (0° is the horizon), the DF assumes that the user wishes to perform a 2D measurement (stages 1-9, and optional stages 14-17) in the plane. If, however, the measured angle by the tilt sensor is 90°±y° (90° is the zenith), the DF assumes that the user wishes to perform the elevation measurement (i.e., stages 10-13). In between those limits, the DF assumes that the user wishes to perform a full 3D measurement (i.e., stages 1-13, and optional stages 14-17).

The description above has shown how the elevation angle θ can be found between the DF and the target. The description has also shown how the distance d to the target can be determined (using the "round trip time" technique). Based on these two parameters, the determination of the difference in height between the DF and the target is merely a manner of simple trigonometry. Therefore, in the following description when the difference in height is mentioned, it is assumed that the DF includes means or calculating the height difference based on said parameters, using trigonometry.

Figure 16A:
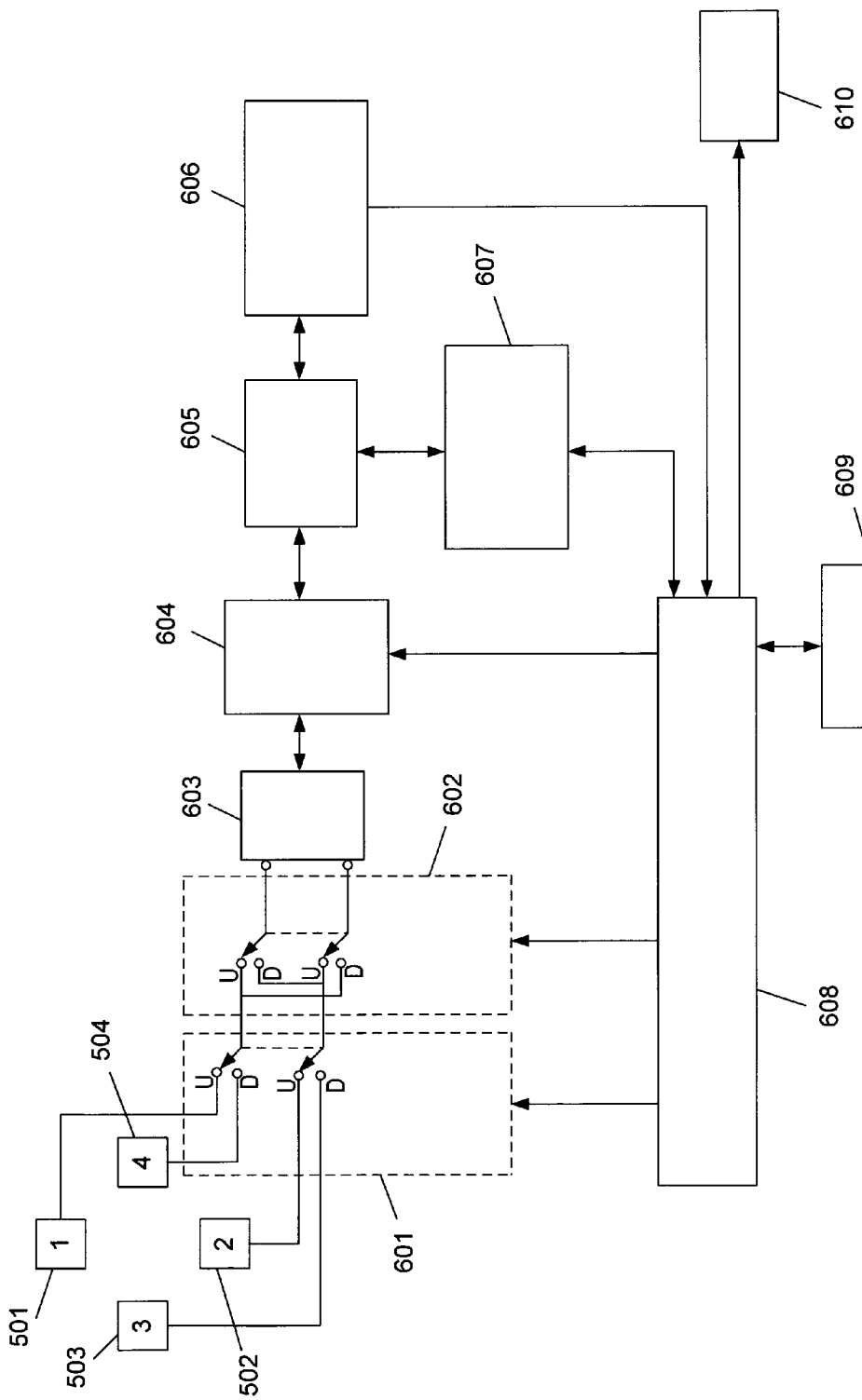
FIG. 16a illustrates the general structure of direction finder 500, according to a hardware embodiment of the present invention.

FIG. 16a illustrates the general structure of direction finder 500, according to a hardware embodiment of the invention. The direction finder comprises a conventional wireless communication unit 605 that communicates with a similar wireless communication unit (not shown) of the target 510. The 90° hybrid junction 603 is used to generate the cardioid patterns shown in FIGS. 15a to 15d. The antenna switch 601 selects the pair of antennas that will be connected to the hybrid junction 603. The crossover switch 602 determines whether cardioids A and C are generated, or alternatively, cardioids B and D. Cardioid A is generated when switch 601 is positioned in its U position while cross-over switch 602 is positioned in its U position. Cardioid B is generated when switch 601 is positioned in its U position while cross-over switch 602 is positioned in its D position. Cardioid C is generated when switch 601 is positioned in its D position while cross-over switch 602 is positioned in its U position. Finally, cardioid D is generated when switch 601 is positioned in its D position while cross-over switch 602 is positioned in its D position.

Controlled attenuator 604 is used for an indirect measurement of the relevant antenna pattern value at the direction to the target, using a communication yes/no principle as described in WO 2009/147662. More specifically, the communication yes/no principle operates as follows: Processing unit 608 accepts from the decision communication yes/no unit 606 the information whether communication with target 510 exists or not. The processing unit 608 controls the position of the switches 601 and 602 according to stages 1-17 of the DF procedure. The processing unit 608 also controls the attenuation level of the controlled attenuator 604. Initially the attenuation of attenuator 604 is set to 0 dB, and communication between the wireless communication unit 605 (of DF 500) and a similar communication unit (not shown) within the target is established. Existence of communication is regarded as "yes" when communication handshake between the two devices (i.e., between the DF and the target) is established. Loss of communication, i.e., "no" communication, is regarded when communication handshake between the two wireless devices does not exist. Attenuation in the wireless communication path is deliberately introduced (either gradually or according to an algorithm) by controlled attenuator 604 until loss of communication. When the cardioid patterns A and C are generated, the minimal attenuations required to lose communication are recorded as $R_A$ and $R_C$ respectively. Similarly, by switching the switches 601 and 602, the cardioid patterns B and D are generated and the minimal attenuations required to lose communication are recorded as $N_B$ and $N_D$ respectively. The values of R and N directly depend on the direction to the target, and on the pattern in use (i.e., the pattern in the relevant stage).

The lookup tables 609 are prepared in advance, and are stored within the DF 500. A first exemplary lookup table 609a, for determining the one or more possible values of φ, is shown in FIG. 17a. A second exemplary lookup table 609b, for determining the one or more possible values of θ, is shown in FIG. 17b. The manner of selecting between various possible angle results will be explained hereinafter. The look up tables 609 are preferably constructed by means of experiments. For example, repeated experiments are performed for targets at various angles and cardioid patters. For example, the relationship between R and N (for example R−N or R/N), as measured, is recorded for each angle. The use of look up tables is advantageous as it can compensate for differences between theoretical and practical issues, such as antenna patters, or factors that may affect the patterns. The device should preferably include one or more of lookup tables according to the following criteria:
 a. The specific pair of antennas in use;
 b. The mode of operation (2D or 3D) and the tilt angle of holding the device;
 c. Operating frequency of the communication (e.g., various WiFi channels);
 d. The antenna type in use (e.g., ceramic, PIFA, etc.);
 e. Effect of the manner of holding the device by the user hands on the antennas patterns, e.g., as measured by proximity sensors on the DF.
 f. Other types of lookup tables to provide more accurate results may be used.

As discussed above, the lookup tables may provide more than one possible resulting angles for a single R and N relationship. The true angle can be found by comparing the results as obtained from several lookup tables, and selecting or calculating the most likely result. For example, if a first lookup table provides the values of 10°, 80°, and 150°, while a second lookup table provides the values of 40°, 86°, and 270°, the most probable value might be suggested to be 83°.

As mentioned above, the DF procedure of the present invention is based on the relationship between R and N rather than absolute values of received signal levels, and therefore the procedure of the present invention is also not affected by the distance between the target and the DF, as long as they can communicate.

Figure 16B:
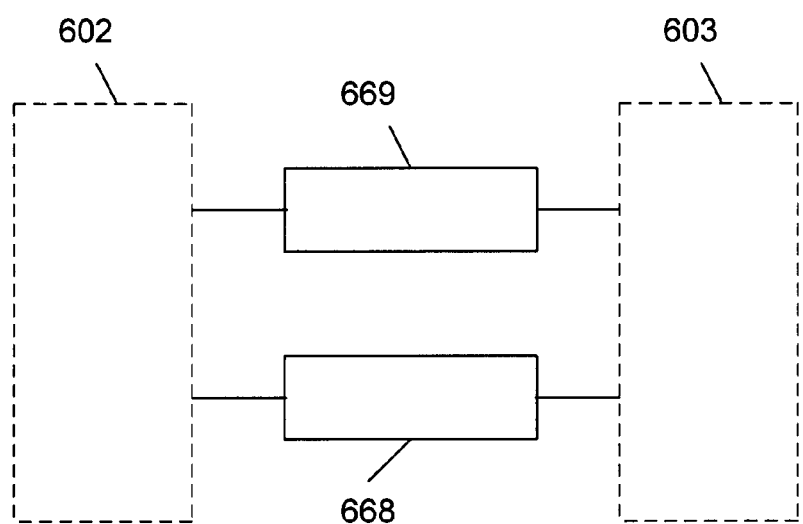
FIG. 16b shows a compensation circuit for the device of the present invention.

In practical situations, the received and transmitted signals at antennas 501, 502, 503, and 504 are not necessarily equal in amplitude and expected phase. Moreover, the antenna switch 601 and the cross over switch 602 may not necessarily have equal loss and phase shift while transferring signals to and from the antennas. Moreover, the 90° hybrid junction 603 is not perfect. These may result in patterns that are distorted relative to the theoretical patterns shown in FIGS. 15a-15d, possibly causing an error in the calculated direction to the target with respect to the true direction. Compensation for this error may obtained by adding an attenuator and/or phase shifter between the cross over switch 602 and hybrid junction 603, as shown in FIG. 16b. A phase shifter 668 compensates for any phase difference in the antennas or other elements to acquire the desired patterns. Attenuator 669 in turn compensates for any amplitude difference in the antennas and other elements, including said phase shifter 668.

Figure 18A:
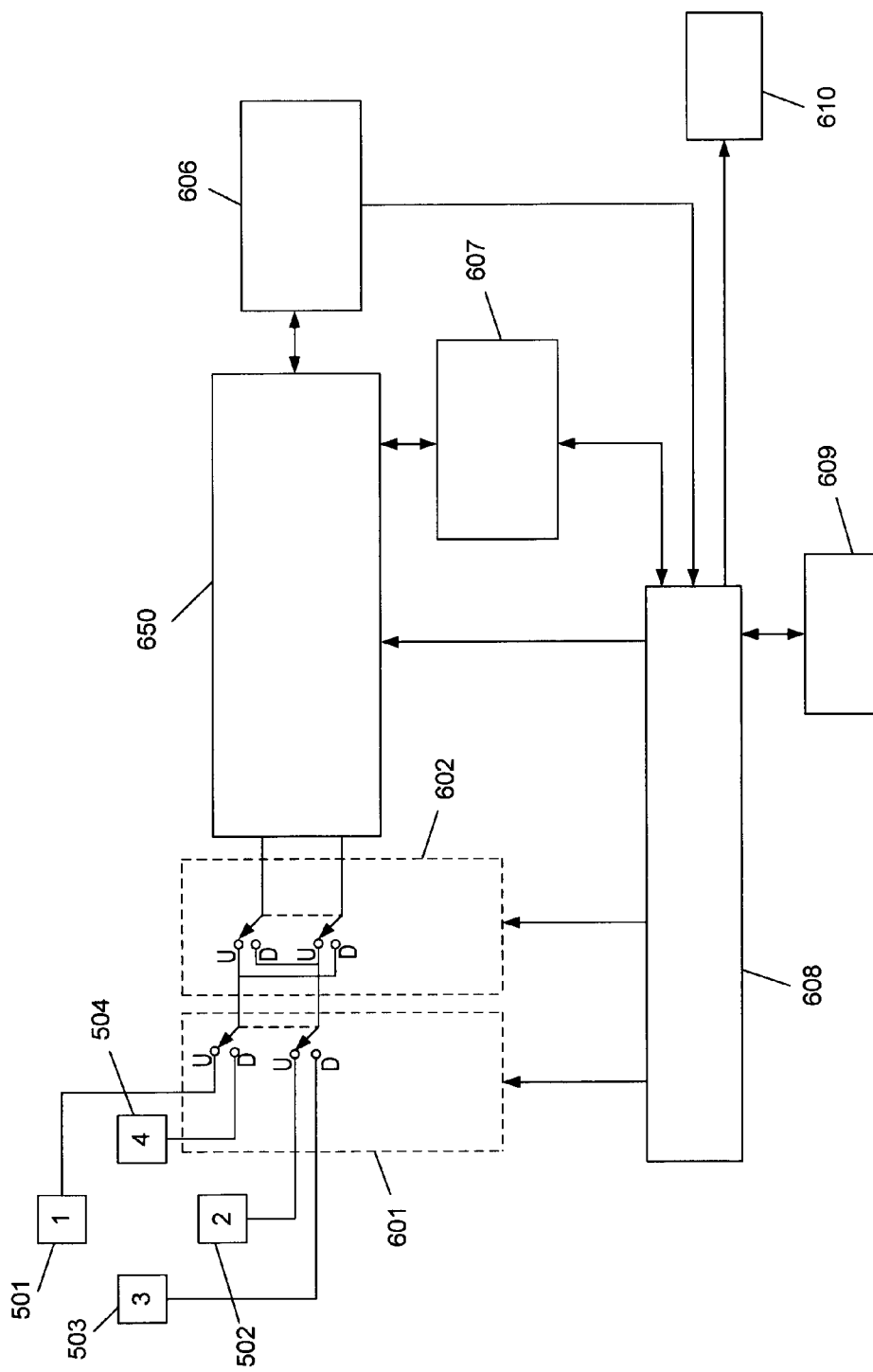
FIGS. 18a and 18b show software implementations of the device and technique of the present invention, having four-antenna and three-antenna arrangements respectively.
Figure 19:
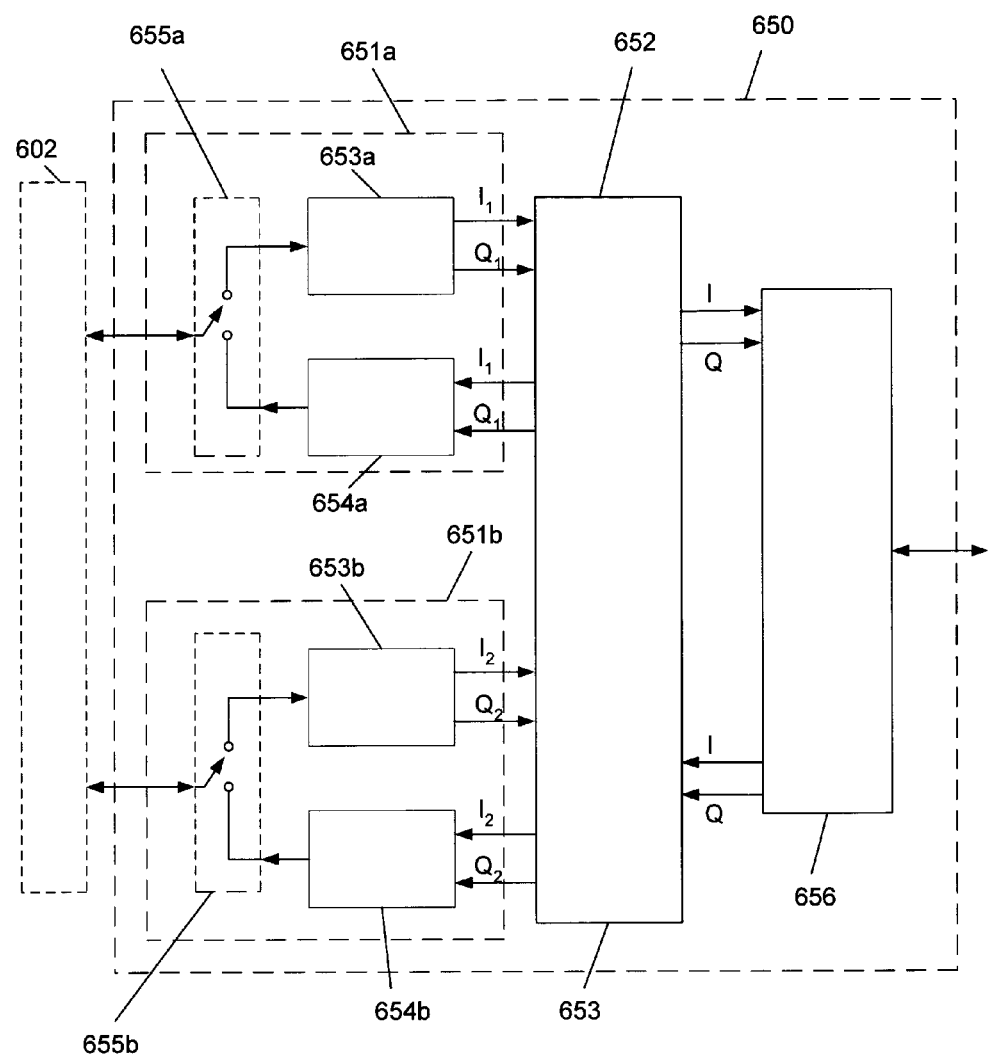
FIG. 19 shows the structure of a processing unit, which is a part of the software implementation, according to one embodiment of the invention.

In yet another embodiment, the DF technique as described above is implemented by software rather than hardware. This implementation is shown in FIG. 18a, and the structure of the processing unit 650 is shown in FIG. 19. In the software implementation, a portion of the hardware implementation of FIG. 16a is replaced by a communication and processing unit 650. The structure of communication and processing unit 650 is shown in FIG. 19. In this software implementation, the same cardioid patterns of the stages as described above are generated digitally rather than using a hybrid junction. A first port of the cross-over switch 602 is connected to a first RF channel 651a, and a second port of the cross-over switch 602 is connected to a second RF channel 651b. The first RF channel 651a comprises a receiver of the first RF channel 653a, a transmitter of the first RF channel 654a, and a T/R switch of the first RF channel 655a. The T/R switch of the first RF channel 655a selects whether to connect the cross-over switch 602 to the receiver 653a, or transmitter 654a, according to the communication mode of operation. The outputs of the receiver of the first RF channel 653a are denoted $I_1$ and $Q_1$ (In-phase/Quadrature), and are conveyed to a cardioid generator and attenuation unit 652. The second RF channel 651b comprises a receiver of the second RF channel 653b, a transmitter of the second RF channel 654b, and a T/R switch of the second RF channel 655b. The T/R switch of the second RF channel 655b selects whether to connect the cross-over switch 602 to the receiver 653b, or transmitter 654b, according to the communication mode of operation. The outputs of the receiver of the second RF channel 653b are denoted $I_2$ and $Q_2$ (In-phase/Quadrature), and are conveyed to a cardioid generator and attenuation unit 652. While receiving, the cardioid generator and attenuation unit 652 generates the cardioid patterns by calculating new I and Q values based on the $I_1$, $Q_1$, and $I_2$, $Q_2$ input values from the receivers 653a and 653b, and conveys them to baseband unit 656. While transmitting, cardioid generator and attenuation unit 652 generates the cardioid patterns by calculating new $I_1$, $Q_1$, and $I_2$, $Q_2$ values and conveys them to the transmitters 654a and 654b based on the I and Q values as received from baseband unit 656. Baseband unit 656 either accepts I,Q values from the cardioid generator and attenuation unit 652, or it conveys I,Q values to baseband unit 656. The baseband unit the baseband unit 656 is connected to the decision communication yes/no unit 606.

The cardioid generator and attenuation unit 652 uses the following equations. While receiving, cardioid patterns A and C, are generated using the equations $I=I_1-Q_2$ and $Q=I_2+Q_1$. Furthermore, cardioid patterns B and D are generated using the equations $I=I_1+Q_2$ and $Q=Q_1-I_2$. While transmitting, cardioid patterns A and C, are generated using the equations $I_1=I$, $Q_1=Q$, $I_2=-Q$ and $Q_2=I$. Furthermore, cardioid patterns B and D are generated using the equations $I_1=I$, $Q_1=Q$, $I_2=Q$ and $Q_2=-I$.

The compensation for any amplitude and phase difference which was performed in the hardware implementation by phase shifter 668 and attenuator 669 (see FIG. 16b), is performed in the software implementation digitally by adding correction factors i and q to each of the abovementioned I and Q equations respectively. The i and q correction factors are digital values, that are either positive or negative. The i and q correction factors may have different values for the different I and Q equations, the required cardioid (A-D), and the criteria impacting or affecting the lookup tables indicated above. The i and q factors are found experimentally, and stored within the DF 500.

Cardioid generator and attenuation unit 652 deliberately and digitally attenuates the received and transmitted signals. More specifically, unit 652 simultaneously attenuates the $I_1$, $Q_1$, and $I_2$, $Q_2$ values while receiving and the $I_1$, $Q_1$, and $I_2$, $Q_2$ values while transmitting. The rest of the components of the software implementation in FIG. 19 function essentially the same as the corresponding components of FIG. 16. Therefore, for the sake of brevity the discussion about these components will not be repeated.

Figure 14B:
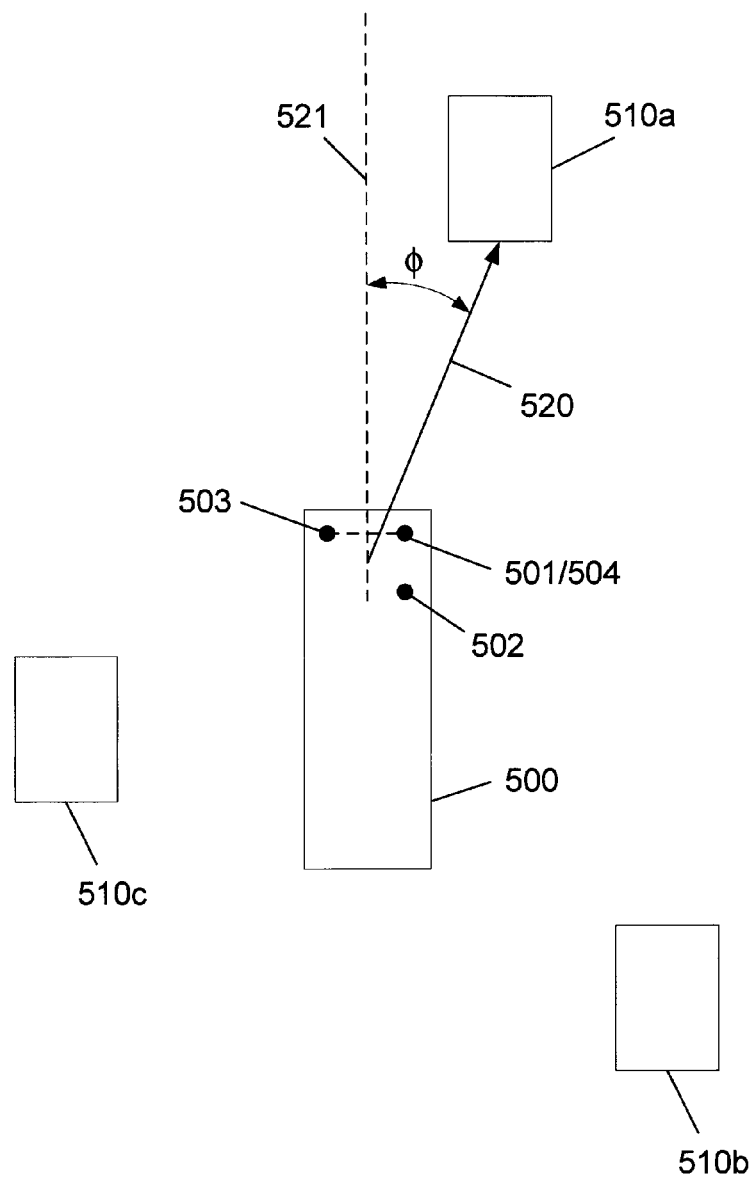
FIG. 14b describes a three-antenna arrangement for determining the direction from a direction finder (DF) 500 to a target device, according to one embodiment of the invention.
Figure 16C:
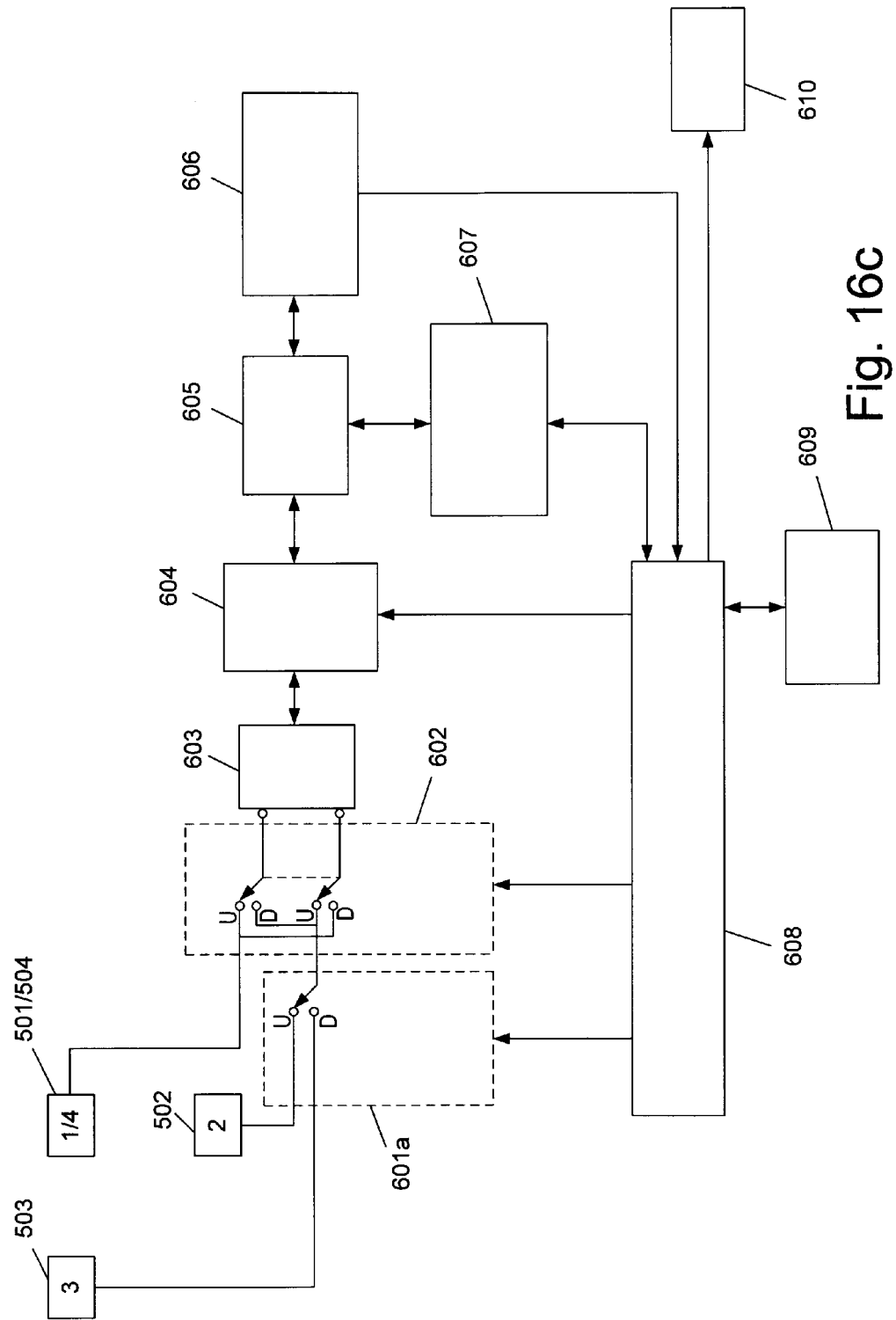
FIG. 16c shows a structure of the device of the present invention, having a three antenna arrangement.
Figure 18B:
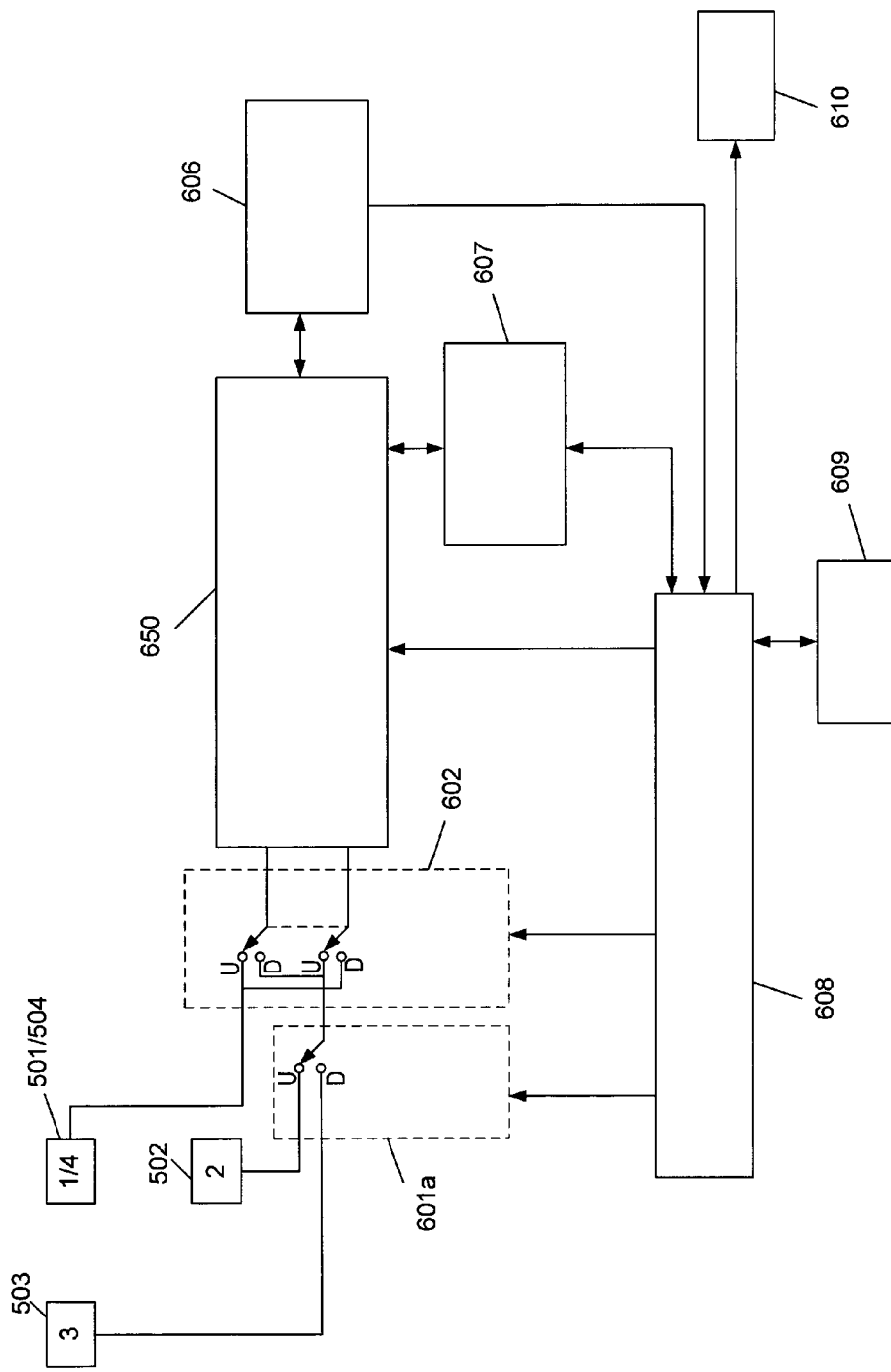

The system, method and device of the invention as described above requires use of two pairs of antennas, antenna pair 501 and 502, and antenna pair 503 and 504, one pair of antennas is used at each given time. It has been found by the inventors that the invention can be performed by use of 3 antennas, where one antenna is common to both pairs. For example, a single antenna 501/504 as shown in FIGS. 14b, 16c, and 18b, may serve the functions of antennas 501 and 504, e.g., as discussed before with respect to FIG. 14. As a result, the antenna switch 601a shown in FIGS. 16c and 18b includes one switch in comparison to the required two switches of FIGS. 16a and 18a. The operation of the 3 antennas configuration is the same as described above with respect to the 4 antennas configuration, with minor required adaptations.

The description thus far demonstrates how the direction to a target can be determined. If determination of the distance is desired, this can be done using the "round trip time" technique by the distance measurement unit 607 shown in FIGS. 16a, 16c, 18a, and 18b. More specifically, the DF sends a signal, e.g., a digital packet (or "ping") and receives a reply. The round trip time from the time of transmission until the time of reception is measured. The distance to the target is calculated using the round trip time, the speed of light, and taking into account the two way travel of the signal, and the processing times of the DF 500 and the target 510.

The description thus far demonstrates how the direction and distance to a single target within the communication range can be determined. If the finding of the directions and distances to plurality of targets is desired, the procedure is repeated for each target separately.

The directions and distances to the targets are displayed in a radar-like manner on the display unit 610 (see FIGS. 16a, 16c, 18a, and 18b).

Figure 20:
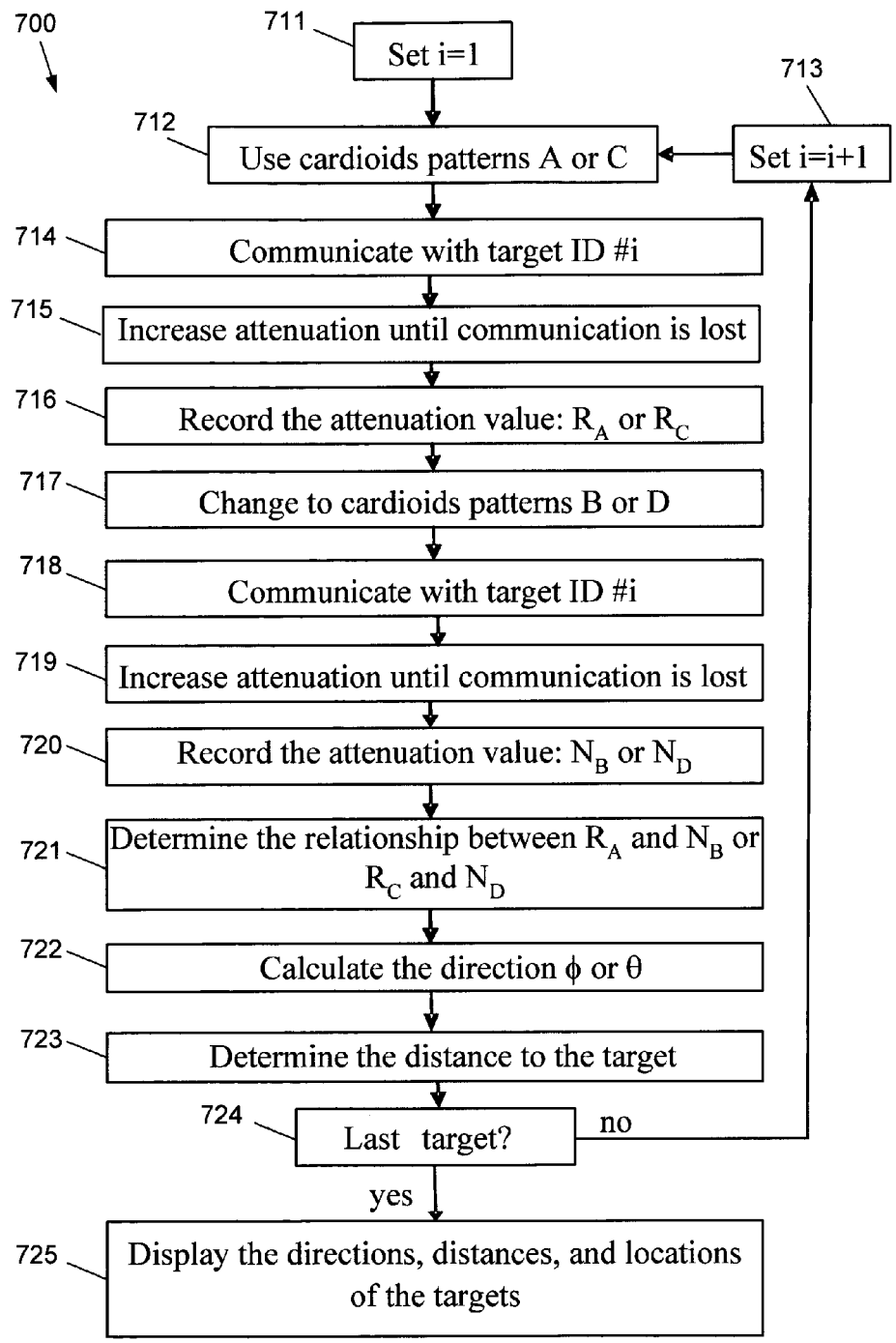
FIG. 20 is a flow diagram illustrating a procedure for determining the directions and distances to several targets in the communication range, according to an embodiment of the present invention.

FIG. 20 is a flow diagram illustrating a procedure 700 for determining the directions and distances to several targets in the communication range (i.e., having wireless communication directly with the DF), according to an embodiment of the present invention. In step 711, an index i, which represents a number which is assigned to each target ID, is set to 1. Next, a cardioid pattern A or C according to the stages above is activated in step 712. In step 714, a communication is established with a target #i. Next, in step 715, the attenuation is increased until loss of communication, and in step 716, the attenuation value $R_A$ or $R_C$ respectively, corresponding to the point of loss of wireless communication are recorded. In step 717, cardioid pattern B or D according to the stages above is activated. In step 718, a communication is again established with a target #i. Next, in step 719, the attenuation is increased until loss of communication, and in step 720, the attenuation values $N_B$ or $N_D$ respectively, corresponding to the point of loss of wireless communication are recorded. In step 722, the relationships between the values $R_A$, $N_B$, $R_C$, and $N_D$ are used to determine the angles $\phi$ and/or $\theta$, according to the stages described above. In step 723 distance to the target is measured. In step 724, the procedure checks whether all targets have bean treated. In the negative case, the index i is increased by 1 in step 713, and the procedure repeats from step 712 for the new target corresponding to the present i (of step 713). If, however, the answer in step 724 is yes, the directions, distances, and locations of all the targets are displayed.

As noted above, the present invention is particularly adapted for use in mobile or stationary devices that can establish direct wireless communication, such as, but not limited to mobile phones, laptops, routers, etc. For sake of convenience, the description hereinafter refers to Wi-Fi type of communication as an example only. As shown above, the device and method of the present invention enables a direction finder (DF) of the present invention to find the relative location of one or more other devices that are located within the communication range. As noted above, the device of the present invention can determine one or more of the relative direction, distance, and relative height between the two communicating devices.

It is well known in the art that WiFi communication between devices can transfer information between the communicating devices far beyond the handshaking information and/or pure discovery information as required by the method device and system as described thus far. The following description will provide examples for the use of the DF of the present invention. The DF according to the following description may be either stationary or mobile. The targets according to the following description are stationary or mobile devices that either have the DF capabilities as described above, or are merely conventional devices that include communication capabilities, such as WiFi, but do not include direction finding capabilities. The following description, if not otherwise stated, assumes that the structure of the DF of the present invention is embedded within a mobile phone, or otherwise externally provided to it, such as by means of a dongle, or other. More specifically, the following illustrations describe various ways to present to a user of a DF device the outcome of the direction finding process, as well as ways to control and operate the process via a user interface of an electronic device.

Figure 21A:
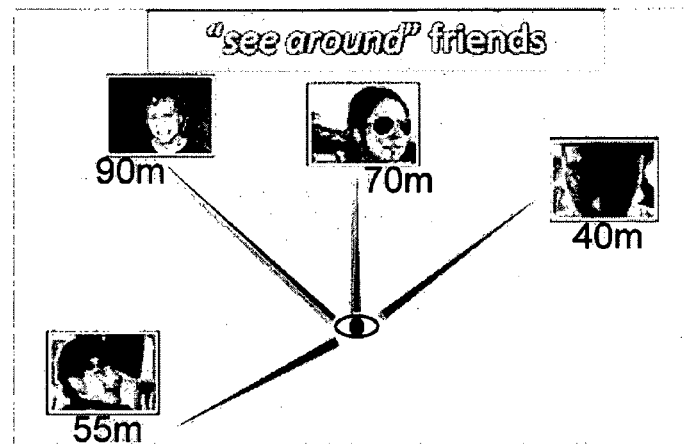
FIGS. 21a and 21b show photos of users in their relative location around a searching DF.
Figure 21B:
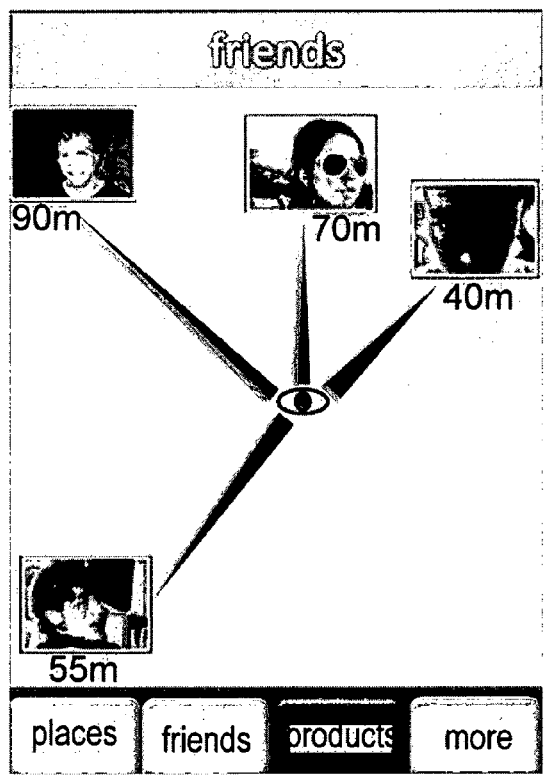

As illustrated in FIGS. 21a and 21b, photos of users around the searching user (i.e., the user operating the DF device) are displayed in their relative location (i.e., direction, distance, and optionally also elevation difference) from the DF device. The directions, distances, and optionally also elevations differences are acquired using the techniques as previously described, while the photos (or any other type of ID which is unique to each target device) are acquired using conventional WiFi communication in a manner well known in the art (for example, by Wi-Fi Direct™).

Obviously, various types of WiFi targets may be determined within the communication range, for example, but not limited to, people, places, products, etc. The invention also enables tracking and/or monitoring the relative locations of at least one target in comparison to the DF device. As the target and/or the user of the DF may be in movement, and as the relative locations may change, a repetitive location finding by the device may update respectively these relative locations in real time (for example, every 1 second). Such an update may be performed as long as direct wireless communication between DF and the target devices exists.

Figure 22A:
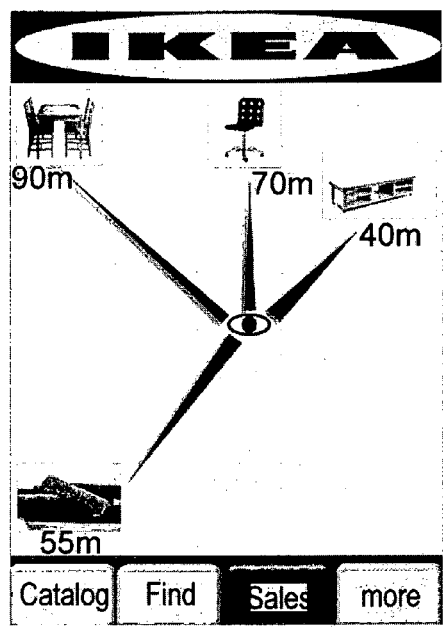
FIG. 22a shows how a product can be located according to one embodiment of the invention.
Figure 22B:
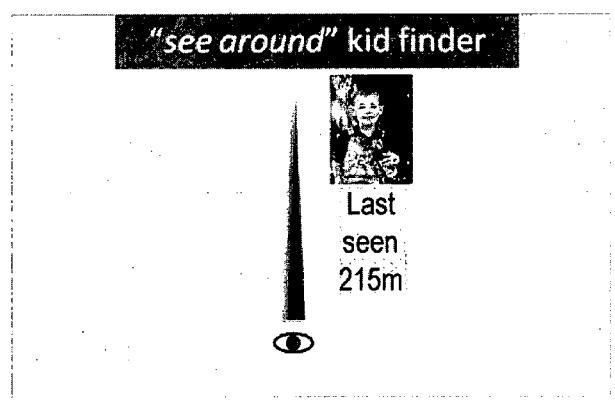
FIG. 22b shows how a kid can be monitored according to one embodiment of the invention.
Figure 22C:
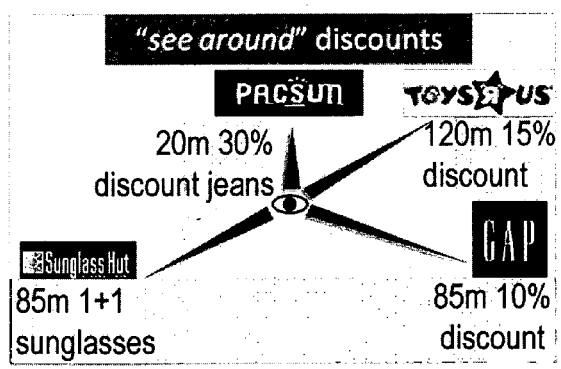
FIG. 22c shows how stores that offer special discounts can be located according to one embodiment of the invention.
Figure 23A:
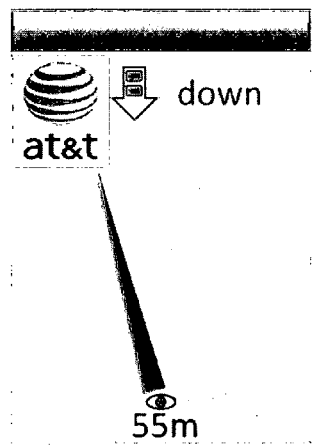
FIGS. 23a, 23b, 23c, and 23d show how a direction and/or elevation to various targets can be determined and displayed, according to one embodiment of the invention.
Figure 23B:
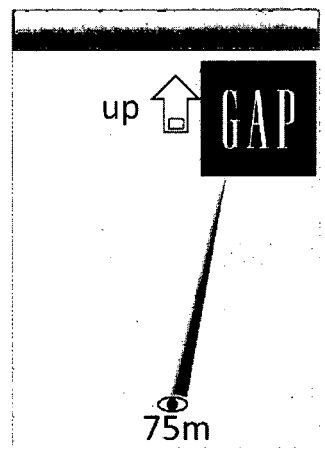
Figure 23C:
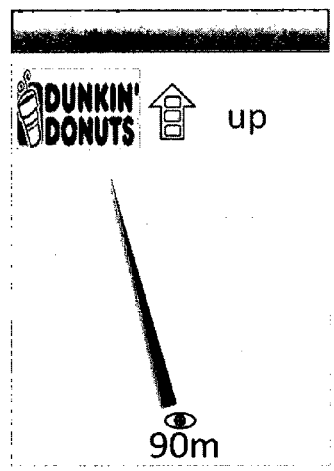
Figure 23D:
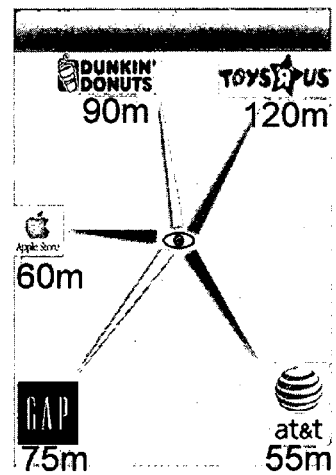

Furthermore, the DF of the present invention is provided with a sorter and filter for selectively displaying targets of interest. The sorting or selection may be performed either before initiating any direction and/or distance and/or height difference measurement, or after. Filtering parameters may vary to include basically any type of data and any possible content, such as, but not limited to, age, gender, occupation, hobbies, languages spoken, current activity (for example; eating, having coffee, shopping, standing in line, etc. . . . ), school, work place, etc., or type of the target business, department, or product. FIG. 22a shows how the user may find his direction to various items within a store or warehouse in which all items are provided with a direct wireless communication means, such as WiFi. In that case, the filter limits the display only to the store's departments, and no other information is shown. In another example, the targets may be attached to specific items. FIG. 22b shows how the device may be used for a child monitoring. In that case, the child is given a wireless device, and the filter limits the display only to show the child's relative location. Moreover, even if sometimes during the monitoring the communication with the child is lost, the direction, distance and optionally elevation difference where the communication with the child's was last successful is displayed. FIG. 22c shows a case where the device, after filtering, displays the direction and distance to stores within the communication range that give a discount prices to customers. The other stores are not shown.

FIGS. 23a-23d show how the DF displays the relative location of one or more targets with respect to the DF. As previously mentioned, the DF can determine the relative location (i.e., distance, direction, and elevation difference) of a target. Given said details, the location may be converted to the number of floors (above or below the DF).

Figure 24A:
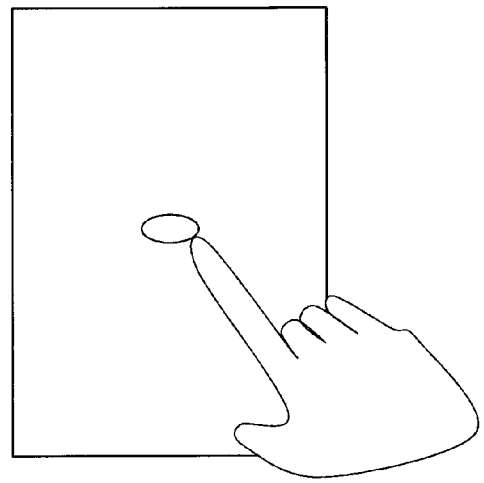
FIGS. 24a and 24b show the setting up of the DF (or a target) as "visible" or "invisible", respectively.
Figure 24B:
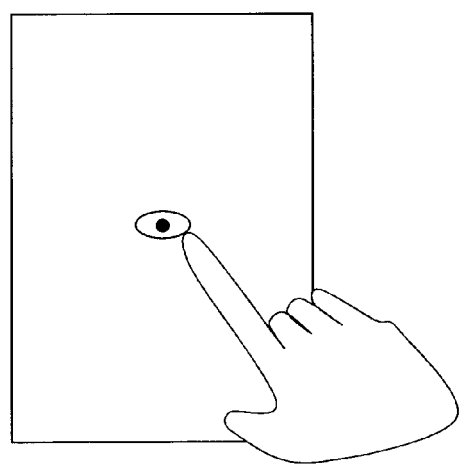

The filter may limit the display to selected targets either according to the floor level (same level, above, below, etc.), according to the gender (male, female, etc.), according to age, product, department in the store, etc., or according to a searching sector which limits the direction of search to a given sector. Furthermore, each target device may limit its "visibility" to the DF. In FIG. 24a the target device is programmed not to be "visible" to the DF. In FIG. 24b the target device is programmed to be visible to the DF.

Figure 25A:
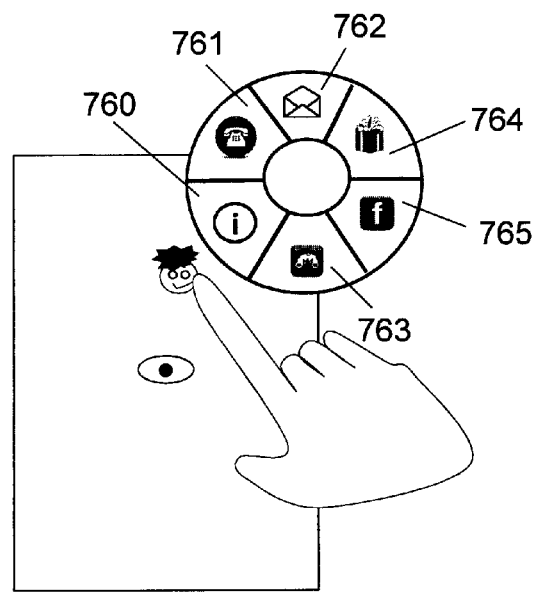
FIGS. 25a, 25b, and 25c show various manners of operation of the device and method of the present invention.
Figure 25B:
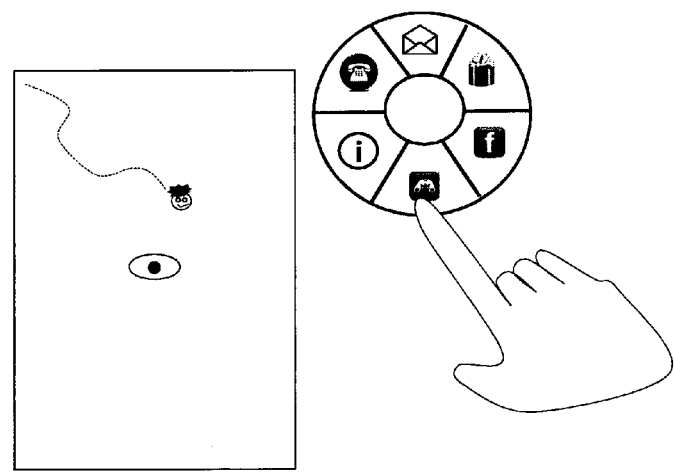
Figure 25C:
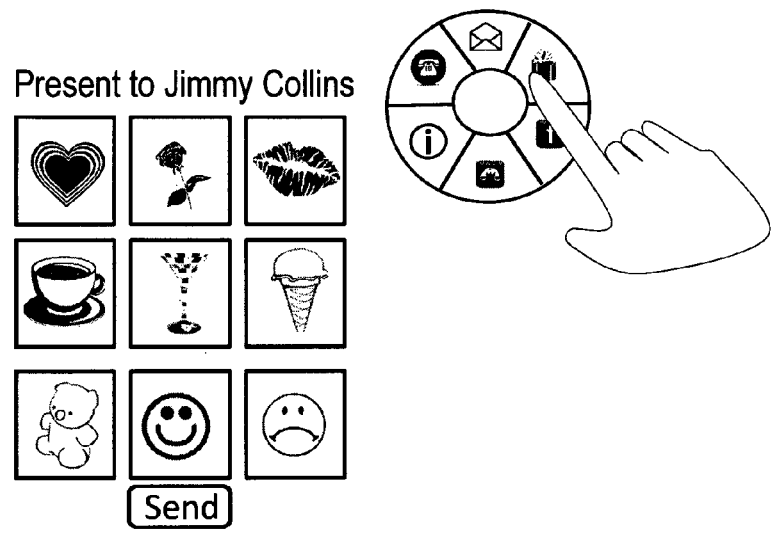

The invention may also enable the establishment of communication with a selected target from the display. For example, as shown in FIG. 25a, selecting a specific target may display a menu for selecting there from an operation to be performed. For example, the user may select performing one or more of: (a) acquiring more information about the target by selecting menu item 760; (b) calling the target by pressing menu item 761; (c) sending a message to the target by selecting menu item 762; (d) the user may wish to track the selected target by pressing menu item 763. In that case, the device will focus on the selected target by repeatedly questioning it, and displaying the route that that it goes through as shown in FIG. 25*b*; (e) he may wish to send a "gift" to the user by pressing menu item 764, and send a selected image from those shown in FIG. 25*c*; or (f) he may select transferring to the user page in "Facebook" (or any other social network) by selecting item 765, and performing any other task which is available there.

Figure 26A:
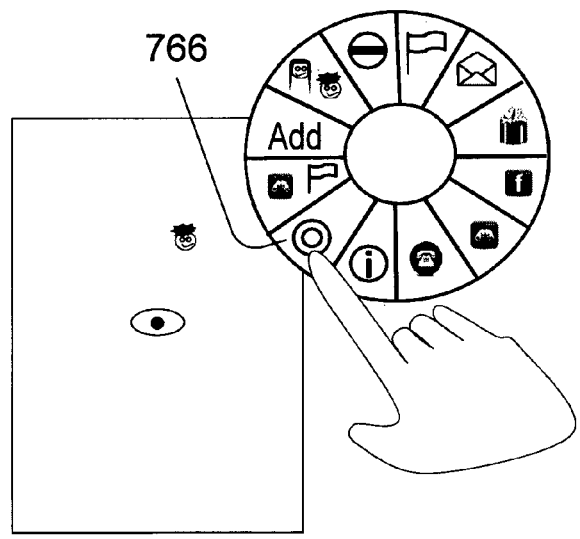
FIGS. 26a, 26b, and 26c show still other manners of operation of the device and method of the present invention.

FIG. 26*a* illustrates the option of adding parameters to a target selection menu. Among the additional parameters are a "fencing" option 766, (i.e.—determining a range from a target or from the DF, and viewing targets within this range. For example, the user may be in a very crowded area, in which he his tightly surrounded by people. Upon looking for targets within the entire range of the Wi-Fi module, many targets may appear. Therefore, the user may wish to limit the display to a given range. When using a multi-touch screen, a user may use the so called option o "pinching" the screen to reduce or enlarge the range of the direct wireless communication, thus reducing or enlarging the fencing radius.

Figure 26B:
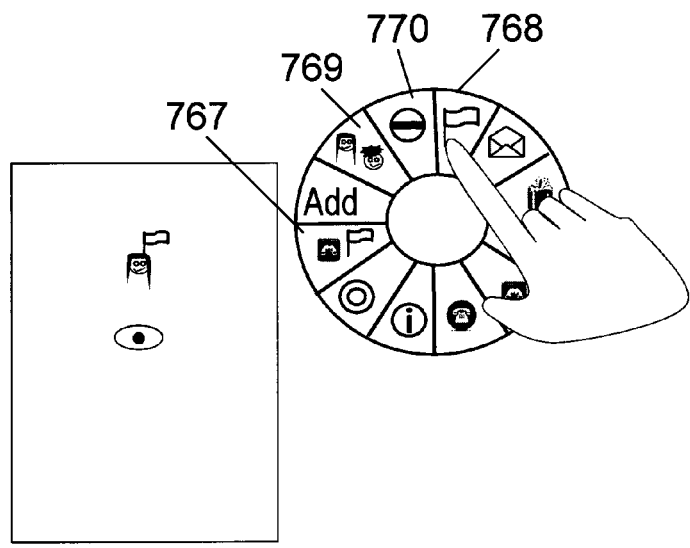
Figure 26C:
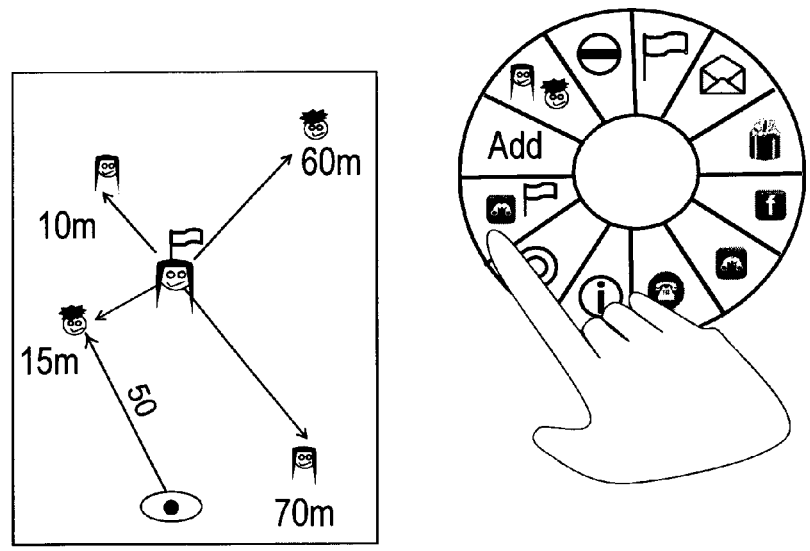

FIG. 26*b* illustrates still another novel feature of the invention, in which the user selects a target and defines it as a "landmark" or "mark". By doing so, this target will serve as a reference to other targets. For example, a user may select defining a Wi-Fi router of "Starbucks" coffee shop as a Landmark, by pressing item 767. Later on, by pressing item 768, the distances, directions, and/or elevation differences in reference to Starbucks will be displayed, as shown in FIG. 26*c*. For example, a user may now view that his friend is located 50 m from him to the left, and also 15 m left of Starbucks. The same feature may be applied to the use of selected classified targets like "people" or "products" as "Marks". For example, a user may define his eldest son as a Mark. Then he can view the relative position of his other kids in relation both to himself and to his eldest son. Furthermore, pressing on menu item 769 may filter targets based on Gender (for example, for casual social networking at a bar/night club/dancing club, etc.). Furthermore, the user may "block" targets from conducting direct wireless communication with him by pressing menu item 770.

The user of the DF may also pre-categorize targets. For example, a user may define at least one contact entry from his phone and/or social network as a "friend". In that case, all the "friends" will be displayed by a specific icon, and all the unknown targets or targets not defined as such will be associated with a different graphical indication. Furthermore, short messages that are received from targets may be issued, and displayed each associated to the respective target (not shown). The user may shuffle between several pre-categorized filters, such that each time the targets corresponding to the filter are displayed.

Figure 27:
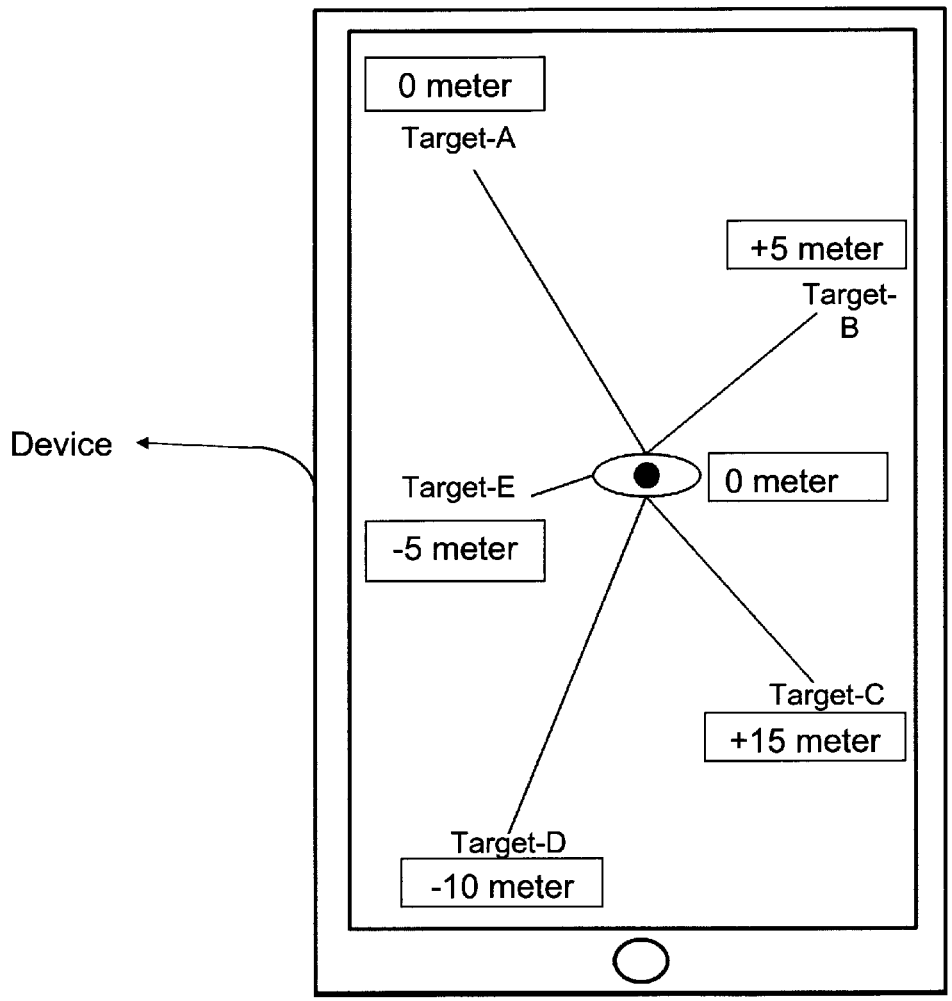
FIG. 27 shows an example for displaying directions to plurality of targets, in addition to the relative elevation of each target, as determined by the device of the present invention.

FIG. 27 shows an example for displaying directions to plurality of targets, in addition to the relative elevation of each target, as determined by the device. The user may apply a filter by elevation parameter, thereby selecting displaying targets that are in the same level of his DF, only those that are above, or only those that are below the DF.

In still another aspect of the invention, the user may select a desired general direction first and only then he may use the device to obtain directions, distances and heights to targets located within the selected general direction. The same may be applied with respect to selection of a general distance.

Furthermore, the invention may be used in conjunction with maps of known sites. When a map of the site is available, the invention may enable finding the location of the device, by floor level, in the site. For example, maps of indoor sites are available. One may download a map of a mall, for example. Store locations in the mall are known, and can be associated with map coordinates. When such maps are prepared, floor heights are include or may be added. However, there is still a need to know at what floor a user of the DF is, in order to use the appropriate floor or site map. By using the invention, together with a database of known locations of targets (map of target locations), a determination of a floor can be performed as follows:

the DF detects the level of at least one target;
said target can be a Landmark;
the device detects the direction and distance to said target;
the height difference between the device and said target is calculated and compared to the known floor heights of the site, as stored in the database of the map;
the location of the DF is calculated based on direction, distance and height difference from the said target;
the location of the device can be shown on the map.

As noted above, the invention may be used for navigation. More specifically, the device may be used to find the relative location between the device and one or more targets within the communication range. Moreover, based on said information, the device may indirectly calculate the relative location between various targets. This enables the user of the DF to navigate toward a selected target. During the navigation, the DF may update the direction, distance and height, by repeating the procedure (for example every 1 second). The DF may also provide indication during the navigation that the user moves away from the target. When the user selects navigation via the user interface, the original distance (i.e.—the last distance measurement) is stored as reference. Later on, if the user moves away from the target, the distance between him and the target may grow. Upon such a growing distance event, the user interface may provide a special indication such that the user may reconsider his movement. An indication via the user interface will be provided to the user that the distance between him and the target he is navigating to has grown. In another aspect, the "Landmarks" targets that are generally stationary (targets representing a physical location or place, for example, such Landmark may be, a "Starbucks WiFi router"), and could be easily seen, can be used during the navigation. The location of the landmark is also more reliable. If the user of a DF is stationary, and if repeated measurements that are used by the device show that a target moves on a route in a specific velocity, a preferable direction may be calculated by the DF in order to guide the user to a future estimated location of the target.

Figure 29:
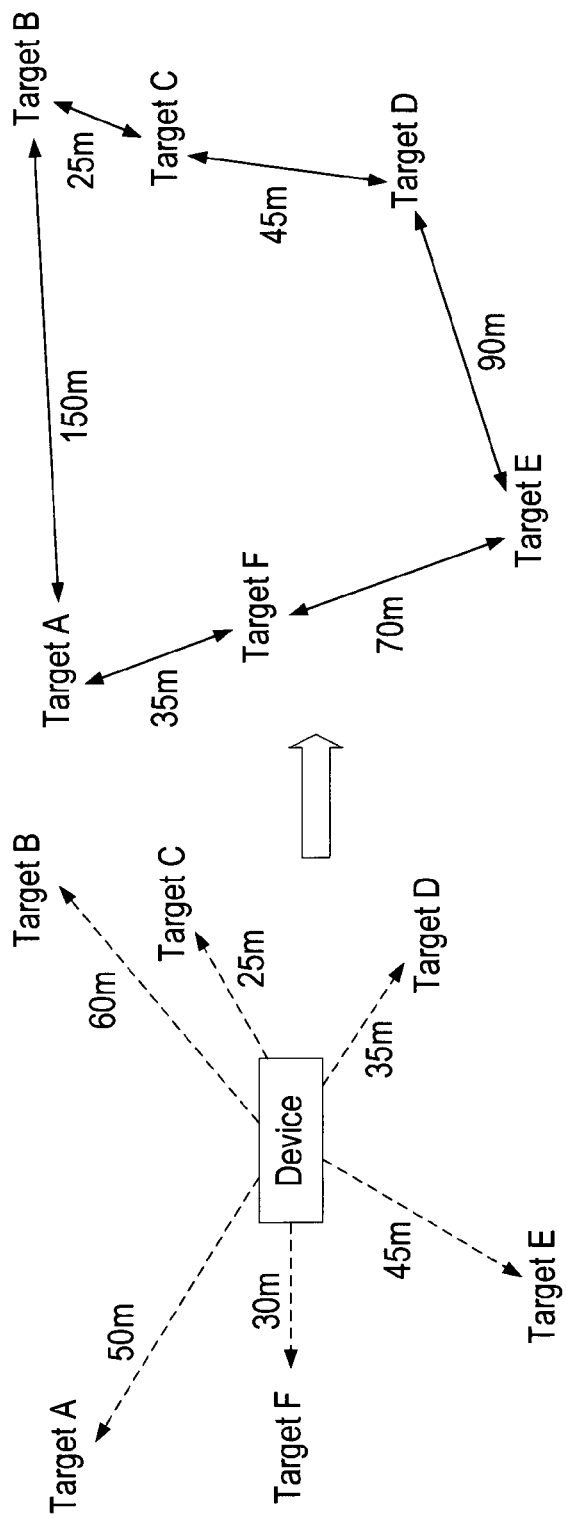
FIG. 29 shows how relative directions and distances between targets is calculated and displayed bf the DF.

The method of the present invention can create a 360° mapping of the relative location and directions between targets located in the communication range. As shown in the left-side of FIG. 29, initially the device finds various targets within the communication range, and displays their relative locations with respect to the DF. Next, the device can calculate the relative distances and directions between the various targets, and display them on the screen of the DF as shown in the right side of FIG. 29.

As noted above, the DF can be used for mapping the relative locations between targets. Upon movement to another location, a different "map" may be produced. The two maps may be combined one large map, if at least one target is common to the two maps. The combined map, or a portion thereof may be displayed to the user.

Figure 28:
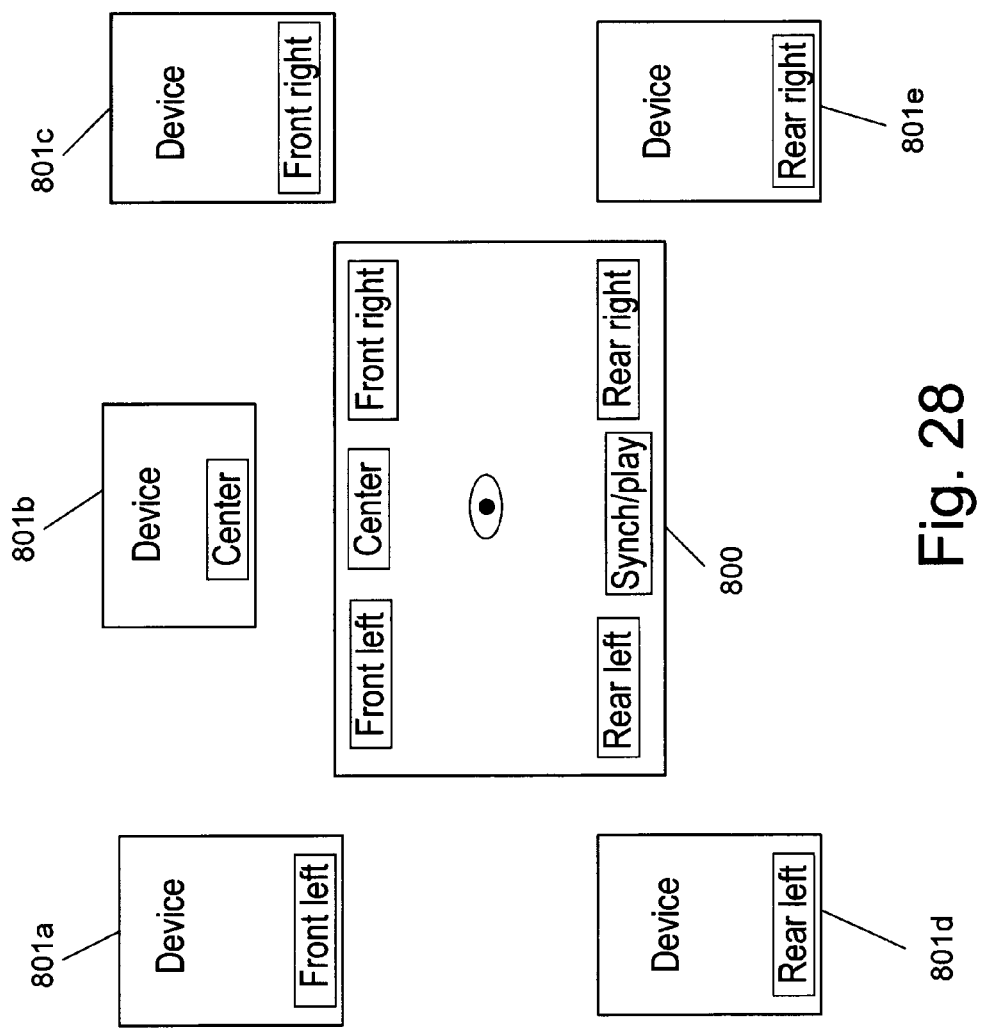
FIG. 28 shows an embodiment of the present invention in which a Dolby system is set up and played, by a DF and plurality of targets.

The DF of the invention may be used for a set-up of a (e.g., 7.1) Dolby Surround (or equivalent) speaker system in a room with a TV. As shown in FIG. 28, the set up is performed by placing "targets" 801*a*-801*e* having sound capabilities (for example, a mobile phone) at a location where a speaker of a Dolby system typically exists, performing the location determination procedure of the present invention by the DF, thereby determining where each of the targets exists, and assigning respectively to each target a respective speaker name (for example, one of the target will be assigned as "right back", another "center", and the others "right", "subwoofer", "left" etc.). Next, following said setup procedure (in which "speakers" in a form of targets are found), the DF, (which in this case also serves as sound distributor, and include the sound relating to each and every channel of the Dolby) can distribute to each target (as said, in this example a mobile phone) its own sound. In such a case, a setup and operation of a Dolby system which comprises plurality of mobile phones is created using the method and system of the present invention. Obviously, the method system and device of the invention may be used for determining the location of various types of targets, and following this determination, distributing any type of data to said targets or performing any operation on said targets. As another example, the invention may also be used in games where the determination of the location of a user (for example, determination of the layout and order of players in a network environment) becomes necessary.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. Method for determining the direction to a target by a direction finder, which comprises:
    a. predefining a direction axis on a plane of the direction finder as a 0° direction;
    b. providing on said plane of the direction finder a first pair and a second pair of antennas, said first and second pairs of antennas are arranged in such a configuration that a first line connecting between the two antennas of the first pair defines a 0°-180° axis which is parallel to said direction axis of the direction finder, and a second line connecting between the two antennas of said second pair of antennas defines a 90°-270° axis which is perpendicular to said direction axis of the direction finder;
    c. generating a 0° antenna pattern A using said first pair of antennas, and establishing a wireless communication between the direction finder and said target;
    d. attenuating the wireless communication signal between the direction finder and said target until the wireless communication is lost, and recording the attenuation value $R_A$ which corresponds to said loss of wireless communication;
    e. generating a 180° antenna pattern B using said first pair of antennas, and establishing a wireless communication between the direction finder and said target;
    f. attenuating the wireless communication signal between the direction finder and said target until the wireless communication is lost, and recording the attenuation value $N_B$ which corresponds to said loss of wireless communication;
    g. determining from the relation between attenuations $R_A$ and $N_B$ and from the respective antenna patterns A and B one or more possible directions to the target;
    h. repeating steps (c)-(g) for antenna patterns C and D in 90° and 270° respectively while using said second pair of antennas, and determining from the respective antenna patterns C and D and from the relation between attenuations $R_C$ and $N_D$ one or more additional possible directions to the target; and
    i. correlating between all the directions as obtained in steps (g) and (h) and concluding a true direction φ to the target.

2. Method according to claim 1, wherein each of the antenna patterns has a form of a cardioid.

3. Method according to claim 1, wherein said two pairs of antennas are four antennas that are arranged in a rhombus configuration.

4. Method according to claim 1, wherein said two pairs of antennas are three antennas that are arranged in a right isosceles triangle, while one of the antennas is common to the two pairs of antennas.

5. Method according to claim 1, wherein a loss of wireless communication is a loss of handshake between the direction finder and the target.

6. Method according to claim 1, wherein the communication signal which is attenuated up to a point of loss of communication is the received signal or the transmitted signal.

7. Method according to claim 1 for a 2D direction finding, wherein said plane of the direction finder is maintained essentially horizontally during said direction finding.

8. Method according to claim 1, for further finding the elevation angle between the direction finder and the target, which further comprises the step of: while maintaining said plane of the direction finder essentially vertical, performing steps (c)-(g), resulting in determination of one or more elevation angles θ to the target.

9. Method according to claim 8, further comprising a verification procedure for the determined elevation angle, which comprises repeating said steps (c)-(g) while using another pair of antennas, and correlation of the results to the previous ones to obtain a true elevation angle.

10. Method according to claim 1 for further determining the distance from the target, wherein the distance is determined using the round trip time of the signal between the direction finder and the target, the speed of light, and the processing times of the direction finder and the target.

11. Method according to claim 8 for compensating a case where the device is not held perfectly vertical, wherein the direction finder further comprises a tilt sensor for measuring the tilt angle δ of the direction finder relative to an axis vertical to the horizon, and subtracting this tilt angle from the elevation angle θ to obtain a true elevation angle.

12. Method according to claim 7 for compensating a case where the device is not held perfectly horizontal, wherein the direction finder further comprises a tilt sensor for measuring the tilt angle δ of the direction finder relative to an axis vertical to the horizon, and compensating respectively the direction φ to obtain a true direction angle φ to the target.

13. Method according to claim 11, wherein the measured angle δ serves for the device as an indication to perform a 2D direction measurement when δ is essentially 0°, an elevation angle measurement when δ is essentially 90°, or both a 2D measurement and an elevation angle measurement when δ is essentially 45° thereby performing a 3D measurement.

14. Method according to claim 1 wherein each determination of the possible directions to the target based on the respective attenuations and on the antenna patterns is performed using one or more equations or one or more look up tables.

15. Method according to claim 8 wherein each determination of the possible elevation of the target with respect to the direction finder based on the respective attenuations and on the antenna patterns is performed using one or more equations or one or more look up tables.

16. Method according to claim 14, wherein the look up tables or equations also comprise correction factors to compensate for one or more of:

a. a specific pair of antennas in use and the characteristics of each antenna;
b. a 2D or 3D mode of operation, and the tilt angle of holding the device;
c. an operating frequency of the communication;
d. an antenna type in use; and
e. effect of the manner of holding the direction finder by the user hands on the antennas patterns.

17. Method according to claim 10, wherein the targets 2D or 3D locations are displayed in a radar-alike manner.

18. Method according to claim 17, which includes requesting by the direction finder and receiving from the target additional information relating to the identity of the target, its status, its type, or its characteristics, and displaying to the user at least a portion thereof.

19. Method according to claim 18, further comprising filtering from the display at least some of the targets, based on targets type, status, location, range from the direction finder or a target, characteristics of targets, angular sector, or a combination thereof.

20. Method according to claim 18 for use in monitoring of a child, wherein the target is attached to a child.

21. Method according to claim 18, wherein the target is attached to a product or is located at a specific department of a store, and wherein the direction to the product or said specific department respectively is determined and displayed.

22. Method according to claim 18, wherein one or more of the targets are defined as Landmarks or Marks.

23. Method according to claim 18, wherein relative distances, elevations, and directions between targets are calculated and displayed.

24. Method according to claim 17, which is performed repeatedly for the purpose of navigation.

25. Method according to claim 24, wherein when both the direction finder and the target are in movement, an estimated meeting location between them is calculated and displayed at the DF.

26. Method according to claim 1, which further comprises a step of transferring by the direction finder data to the target, or performing operation at the DF based on the results of the direction finding.

27. Method according to claim 26, for operating a music system, wherein at a first stage targets are located and assigned a speaker name, and at a second stage music data are transferred respectively to each of the targets.

28. A direction finder for determining the direction to a target, which comprises:
a. a first pair and a second pair of antennas, said first and second pairs of antennas are arranged on a plane of the direction finder in such a configuration that a first line connecting between the two antennas of the first pair defines a 0°-180° axis which is parallel to said direction axis of the direction finder, and a second line connecting between the two antennas of said second pair of antennas defines a 90°-270° axis which is perpendicular to said direction axis of the direction finder;
b. a wireless communication unit for establishing communication with a target via a wireless communication signal;
c. a controlled attenuator for attenuating said wireless communication signal;
d. a hybrid junction for enabling wireless communication of said signal in a selected antenna pattern each time via one of said pairs of antennas; and
e. a processing unit for:
  e.1. switching said hybrid junction to generate and transmit a 0° antenna pattern A through the first pair of antennas, attenuating the signal until the wireless communication is lost, and recording the attenuation value which corresponds to said loss of wireless communication as an $R_A$ attenuation value;
  e.2. switching at the hybrid junction to generate a 180° antenna pattern B through the first pair of antennas, attenuating the signal until the wireless communication is lost, and recording the attenuation value which corresponds to said loss of wireless communication as an $N_B$ attenuation value;
  e.3. using one or more equations or look up tables, determining from the difference $R_A$-$N_B$, one or more possible directions to the target;
  e.4. repeating steps (e.1)-(e.3) while transmitting antenna patterns C and D in 90° and 270° respectively through the second pair of antennas, and determining from the antenna patterns C and D respectively and from the relation between attenuations $R_C$ and $N_D$ one or more additional possible directions to the target; and
  e.5. correlating between all the directions as obtained in steps (e.3) and (e.4) and concluding a true direction $\phi$ to the target.

29. A direction finder according to claim 28, wherein said wireless communication unit, controlled attenuator, and hybrid junction are implemented by software.

30. A direction finder according to claim 28, for finding a 2D direction to the target.

31. A direction finder according to claim 28, for further finding the elevation of the target with respect to the direction finder, wherein the processing unit is further used for: while maintaining said plane of the direction finder essentially vertical, performing steps (e.1)-(e.3), resulting in determination of one or more elevation angles θ between the direction finder and the target.

32. A direction finder according to claim 30, further comprising a tilt sensor for measuring the tilt angle δ of the direction finder relative to an axis vertical to the horizon, and subtracting this tilt angle from the determined elevation angle θ to obtain a true elevation angle, thereby compensating for a case where the direction finder is not held perfectly vertical.

* * * * *

UNITED STATES PATENT AND TRADEMARK OFFICE
CERTIFICATE OF CORRECTION

| | | |
|---|---|---|
| PATENT NO. | : 8,988,283 B2 | Page 1 of 1 |
| APPLICATION NO. | : 13/634736 | |
| DATED | : March 24, 2015 | |
| INVENTOR(S) | : Erad et al. | |

It is certified that error appears in the above-identified patent and that said Letters Patent is hereby corrected as shown below:

Title Page,
Item (75) Third inventor: "Gal Vered" should read --Gad Vered--.

Signed and Sealed this
Fourteenth Day of July, 2015

Michelle K. Lee
*Director of the United States Patent and Trademark Office*